United States Patent
Blacklin

(10) Patent No.: US 12,480,085 B1
(45) Date of Patent: Nov. 25, 2025

(54) REACTOR SAMPLING APPARATUS, SYSTEM, AND METHOD

(71) Applicant: Mettler-Toledo Autochem, Inc., Columbia, MD (US)

(72) Inventor: Peter Alfred Blacklin, Columbia, MD (US)

(73) Assignee: Mettler-Toledo Autochem, Inc., Columbia, MD (US)

( * ) Notice: Subject to any disclaimer, the term of this patent is extended or adjusted under 35 U.S.C. 154(b) by 0 days.

(21) Appl. No.: 19/039,932

(22) Filed: Jan. 29, 2025

(51) Int. Cl.
*C12M 1/26* (2006.01)
*G01N 1/10* (2006.01)

(52) U.S. Cl.
CPC ............... *C12M 33/07* (2013.01); *G01N 1/10* (2013.01)

(58) Field of Classification Search
None
See application file for complete search history.

(56) References Cited

U.S. PATENT DOCUMENTS

| | | | |
|---|---|---|---|
| 3,830,106 A * | 8/1974 | Gardiner | B01D 61/28 73/863.81 |
| 4,136,561 A * | 1/1979 | Mueller | G01F 23/245 73/431 |
| 4,346,609 A | 8/1982 | Diesel | |
| 4,866,996 A * | 9/1989 | Nohl | G01N 1/28 73/864 |
| 6,393,926 B1 * | 5/2002 | Bowersox, Jr. | B01L 3/0217 73/864.64 |
| 8,365,617 B2 * | 2/2013 | Blacklin | G01N 1/2035 422/501 |
| 10,006,838 B2 | 6/2018 | Tokarski | |
| 11,085,854 B2 | 8/2021 | Zhao et al. | |
| 2008/0184779 A1 * | 8/2008 | Johns | B01J 8/06 73/40 |

(Continued)

FOREIGN PATENT DOCUMENTS

CN 109781474 B 1/2021

OTHER PUBLICATIONS

Rheonics, SRD-X7 RP Reactor Probe Density and Viscosity Meter, https://support.rheonics.com/en/support/solutions/articles/81000412396-srd-x7-rp-reactor-probe-density-and-viscosity-meter, Feb. 12, 2024, updated Aug. 7, 2024, 6 pages.

(Continued)

*Primary Examiner* — Henry H Nguyen
(74) *Attorney, Agent, or Firm* — Standley Law Group LLP; Jeffrey S. Standley; Adam J. Smith

(57) ABSTRACT

A probe tube subassembly for a sampling apparatus, and related systems and methods are disclosed. The probe tube subassembly includes a probe tube, a retaining sleeve connected to the probe tube, an inner sleeve positioned within the retaining sleeve and comprising apertures, sample tubes, each extending within the probe tube and through a respective one of the apertures, and a sample head positioned within the inner sleeve and including a pocket located at a distal end portion thereof. The sample head is axially slidable within the inner sleeve between an extended position where the pocket is exposed to an ambient environment, and a retracted position where the pocket is covered by the inner sleeve. The disclosed subassembly and related apparatus, systems, and methods provide improved performance and ease of servicing, among other advantages.

19 Claims, 22 Drawing Sheets

(56) References Cited

U.S. PATENT DOCUMENTS

| | | | |
|---|---|---|---|
| 2011/0318243 A1* | 12/2011 | Blacklin | G01N 1/2035 |
| | | | 422/501 |
| 2018/0251713 A1* | 9/2018 | Angelescu | C12M 1/34 |
| 2019/0113420 A1* | 4/2019 | Johnson | B05B 1/22 |
| 2021/0325351 A1* | 10/2021 | Fang | G01N 30/06 |
| 2022/0071604 A1 | 3/2022 | Mide et al. | |
| 2022/0307986 A1 | 9/2022 | Hassell et al. | |
| 2023/0131523 A1 | 4/2023 | Putten et al. | |

OTHER PUBLICATIONS

Remspec, ReactionProbe™ Accessory Systems For In-Situ Spectroscopy and Reaction Monitoring, http://remspec.com/Brochures/ReactionProbe.pdf, URL accessed Nov. 6, 2024, 4 pages.

* cited by examiner

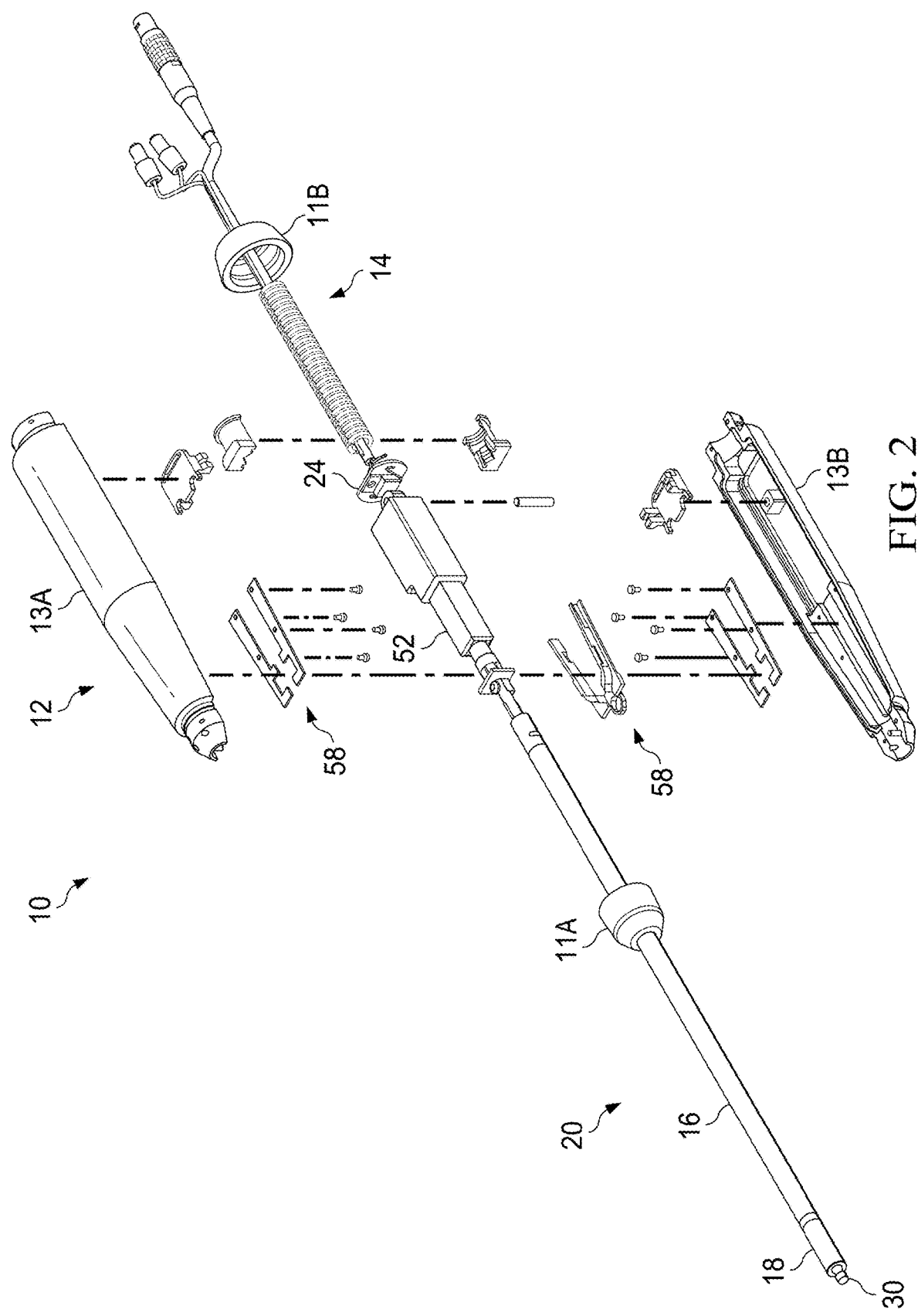

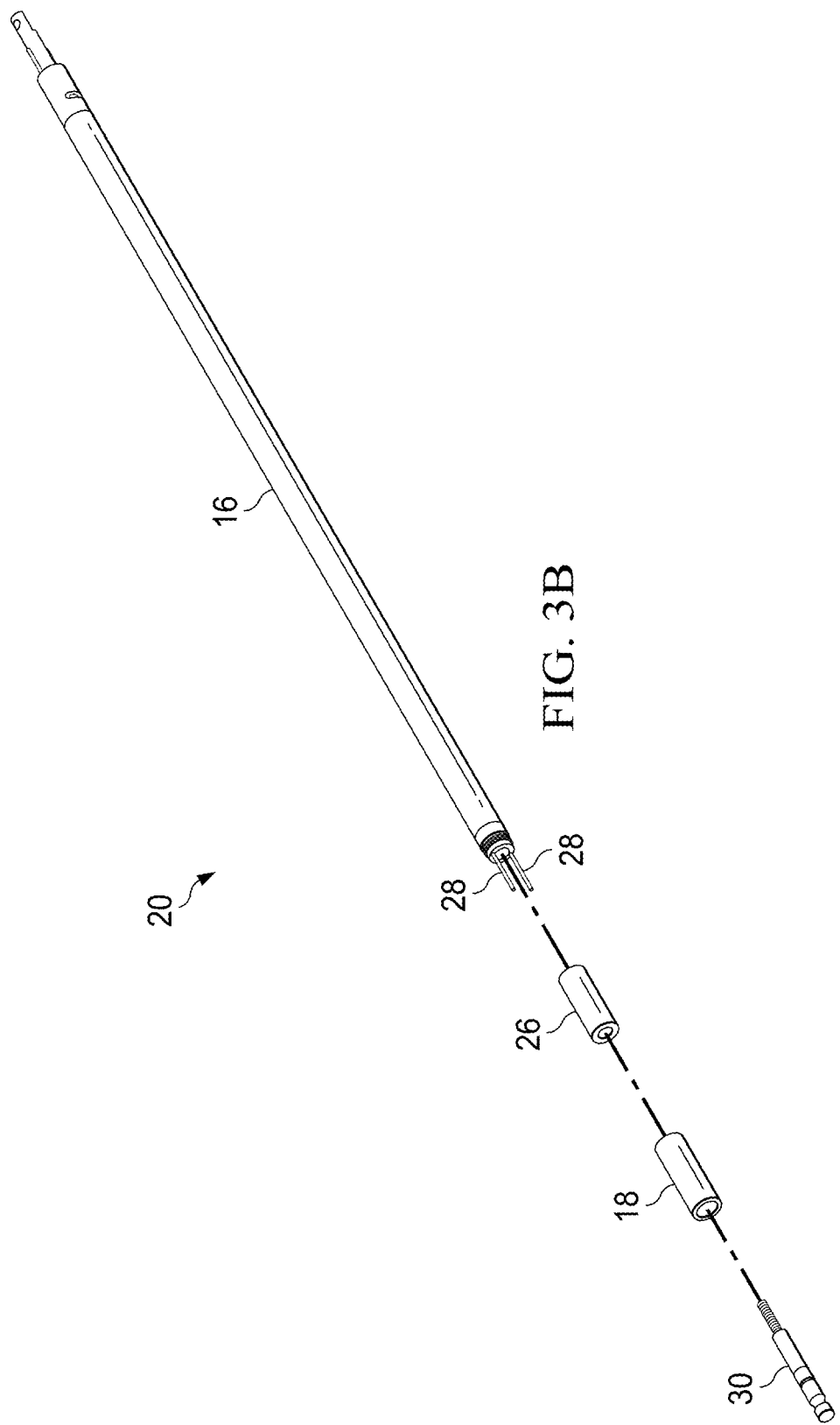

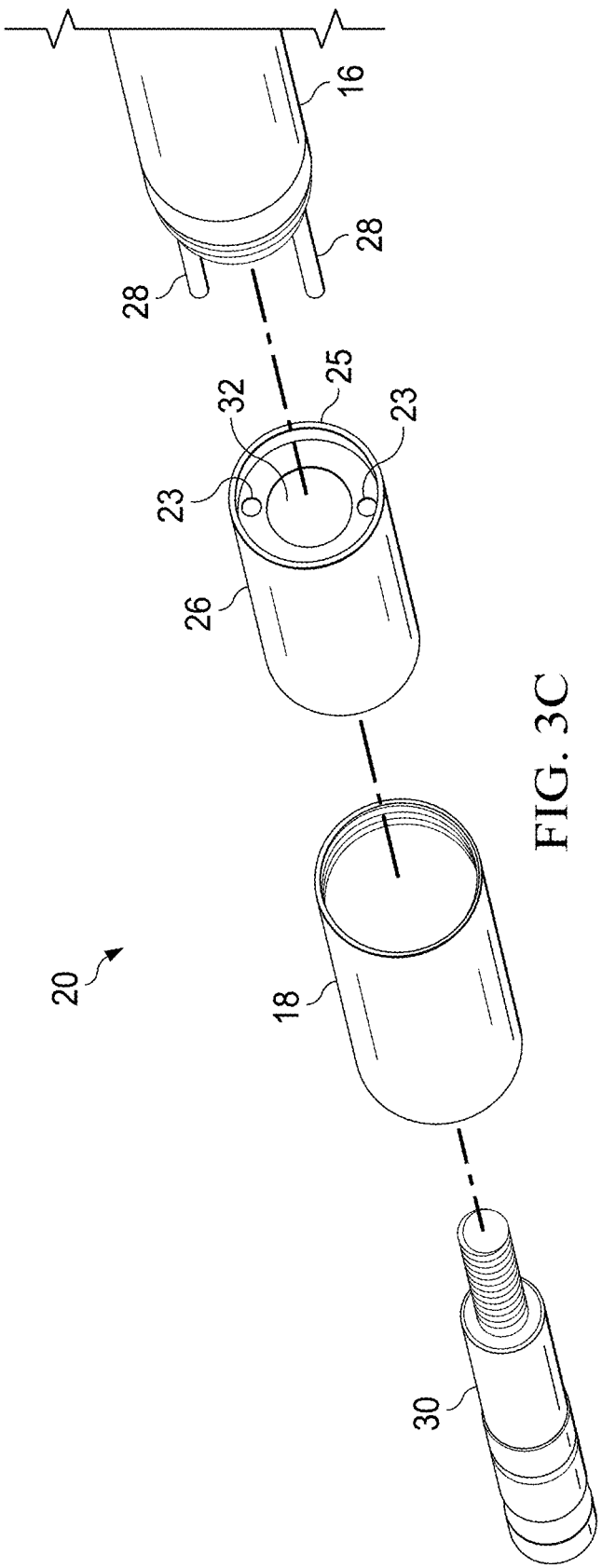

REACTOR SAMPLING APPARATUS, SYSTEM, AND METHOD

CROSS-REFERENCE TO RELATED APPLICATIONS

This application is filed as original and therefore makes no priority claim.

TECHNICAL FIELD

Exemplary embodiments relate generally to a reactor sampling apparatus, such as for in-situ sampling of reactor fluids, and related systems and methods.

BACKGROUND AND SUMMARY OF THE INVENTION

Reactor samplers are known which assist with gathering samples from a reaction while underway. These reactions may be performed at a wide range of temperatures and/or pressures, for example. As such, the sampler, or at least portions thereof, must be configured to withstand a wide range of extreme conditions and/or rapid condition changes. This is complicated by the inherent performance characteristics of certain materials, which may change under differing conditions (e.g., thermal expansion/contraction, yield strength, stiffness, and the like). Thus, a sampler which is robustly designed to withstand these relatively varying and extreme conditions on a regular basis is desirable. Alternatively, or additionally, and particularly in view of the aforementioned repeat exposure to relatively varying and extreme conditions, various components of the sampler sometimes need to be replaced or otherwise serviced. Thus, a reactor sampler with relatively easy servicing is desirable.

A reactor sampler apparatus (hereinafter also "sampler") capable of withstanding repeated exposure to varying and extreme conditions and/or providing easy servicing is disclosed. The sampler includes sample tubes, preferably comprising metal, which extend through a probe tube and an inner sleeve, the latter preferably comprising polytetrafluoroethylene (PTFE). The sample tubes may extend through apertures (e.g., channels) in an inner sleeve, such that the inner sleeve may be removed as needed for servicing (e.g., replacement). The probe tube may extend from a distal end of, through, or at least partially within, a handling assembly. A conduit may extend from a proximal end of the handling assembly, such as with the sample tubes and/or electrical connections for the sampler extending therethrough for connection to external components.

The extension of the sample tubes through at least the inner sleeve and/or probe tube increases strength and/or rigidity of the device and/or reduces thermal exposure of the sample tubes to the reaction, which may in turn prevent or reduce unintended detachment or other damage to the sampler. This arrangement also reduces the need for bends in the sample tubes (e.g., allowing the sample tubes to extend in a relatively straight line), thereby improving fluid flow (e.g., neutral solution, sample fluid, quench fluid, dilution fluid, and/or flushing/cleaning solution) through the sample tubes and/or other parts of the sampler.

The inner sleeve is retained, at least in part, by a retaining sleeve. The retaining sleeve preferably comprises metal. The retaining sleeve may be attached to a distal end of the probe tube, such as by a threaded connection. The retaining sleeve may include a lip for frictionally engaging a distal end of the inner sleeve.

A sample head may fit within a through passage of the inner sleeve, which preferably extends along a centerline thereof, and may be connected to a drive shaft extending within the probe tube, such as by threaded connection which allows the sample head to be removed for servicing as needed. The drive shaft may be connected (directly or indirectly) to an actuator subassembly in the handling assembly for moving the sample head between an extended position where a pocket is exposed and a retracted position where the pocket is located within the inner sleeve and fluidly connected to the sample tubes. When in the extended position, the sample head includes a channel which aligns with the sample tubes, thereby allowing fluid flow, such as for quench fluid charging, through the sample tubes.

The pocket of the sample head is preferably annular in shape, which may improve fluid flow during sampling and other operations (e.g., quench, dilution, flushing/cleaning). Alternatively, or additionally, the annular shaped pocket may allow for relatively easy construction of various size pockets.

The sampler configuration permits relatively easy servicing, such as inner sleeve changes, with a series of relatively simple tools and manual operations. In exemplary embodiments, a first servicing tool is used to remove the sample head, a second servicing tool is inserted within the through passage of the inner sleeve to preserve shape, a third servicing tool is used to remove the retaining sleeve, and a fourth servicing tool is used to remove the inner sleeve. A new inner sleeve may be provided and the steps followed in reverse to reassemble the sampler.

The handling assembly may optionally include sensors, such as optical sensors for detecting travel of the drive shaft and/or actuator subassembly and/or fluid sensors to detect leaks in the handling assembly.

The sampler configuration may be relatively easy to service and manufacture, such as reducing complexity, costs, part count, combinations thereof, or the like. The ease of servicing may be particularly desirable given the relatively extreme and varied conditions the sampler is intended for use in. The servicing may be advantageously capable of accomplishment using relatively hand tools by a less experienced user. Some or all of the tools may be readily available. The sampler configuration advantageously permits relatively simple servicing of certain parts which most frequently need replaced, such as the inner sleeve. For example, the inner sleeve may be changed without dismounting the probe from the actuator body. The sample head may also be changed, such as to provide different pocket sizes and/or shapes. The sample head may provide a broad operational temperature range. The sample head may be machined from a single piece and/or otherwise be integrally formed. Alternatively, the sample head may be formed from multiple elements clamped together and/or sealed by O-rings, such as of limited elasticity. The sample head is also simpler and may allow for different size and/or shape pockets. The extension of the sample tubes through the inner sleeve and the probe tube may result in fewer turns, bends, and/or other transitions, resulting in smoother flow and/or reduced potential for cross contamination. Particularly, but not necessarily, when the sample tubes comprise or consist of metal, they may add stiffness and/or strength to the sampler, which may be particularly desirable given the relatively extreme and varied conditions the sampler is intended for use in. This may alternatively and/or additionally stabilize the geometry of the inner sleeve. This may alternatively and/or additionally allow for higher pressure fluids, thereby reducing cycle time. The position of the sample head may be controlled by internal stops. Axially fixing the drive shaft and/or actuation subassembly may allow for the sample head to be removed and connected by threaded engagements. The sampler configuration may improve thermal performance. Various numbers, preferably in even pairs, of sample tubes may be utilized. The inner sleeve, retaining sleeve, probe tube, and/or sample head may be scaled to various dimensions without changing the actuating subassembly and/or handling subassembly. The sample head may be adapted to mount a filter.

In an exemplary embodiment, a probe tube subassembly for a sampling apparatus includes a probe tube, a retaining sleeve connected to the probe tube, an inner sleeve positioned within the retaining sleeve and comprising apertures, sample tubes, each extending within the probe tube and through a respective one of the apertures, and a sample head positioned within the inner sleeve and comprising a pocket located at a distal end portion thereof, wherein the sample head is axially slidable within the inner sleeve between an extended position where the pocket is exposed to an ambient environment, and a retracted position where the pocket is covered by the inner sleeve.

The inner sleeve may comprise polytetrafluoroethylene (PTFE), and/or sample tubes may each comprise metal in an embodiment.

The pocket may be annular in shape in any of the foregoing embodiments.

The sample head may comprise a channel circumscribing an outer surface of the sample, the channel may be spaced apart from the pocket and is located such that, when the sample head is in the extended position, the channel is fluidly connected to the sample tubes, and when the sample head is in the retracted position, the channel is fluidly separated from the sample tubes, and/or the pocket may be located such that, when the sample head is in the retracted position, the pocket is fluidly connected to the sample tubes, and when the sample head is in the extended position, the pocket is fluidly separated from the sample tubes in any of the foregoing embodiments.

The retaining sleeve may comprise a lip for mechanically engaging a distal end of the inner sleeve, the inner sleeve may comprise a through passage for the sample head, and/or the retaining sleeve may be engaged to the probe tube by mating threads in any of the foregoing embodiments.

The probe tube assembly may include a drive shaft extending within the probe tube, wherein the sample head is engaged to the drive shaft by mating threads in any of the foregoing embodiments.

The sample tubes may extend within the probe tube in at least a substantially straight line in any of the foregoing embodiments.

The sample tubes may consist of two sample tubes in any of the foregoing embodiments.

The inner sleeve may comprise a protruding lip, the probe tube may comprise an extending portion, and the protruding lip of the inner sleeve may extend about the extending portion of the probe tube in any of the foregoing embodiments.

The sample tubes may extend through the probe tube and extend beyond both a distal end and a proximal end of the probe tube in any of the foregoing embodiments.

In another exemplary embodiment, a reactor sampling apparatus includes the probe tube subassembly of any of the foregoing embodiments, and may further include a drive shaft extending within the probe tube, and a handling subassembly comprising a housing and an actuator subassembly located within the housing, wherein a proximal end of the probe tube extends within the housing of the handling subassembly, and the drive shaft is connected, directly or indirectly, to the actuator subassembly.

The reactor sampling apparatus may further include at least one optical sensor located within the housing, a local controller located within the housing an in electronic communication with the actuator subassembly at the at least one optical sensor, said local controller comprising software instructions, which when executed, configure said local controller to: command operation of the actuator subassembly, receive data from the at least one optical sensor, and determine whether the sample head of the probe tube subassembly is in the extended position or the retracted position.

The reactor sampling apparatus may include at least one output provided at said housing, wherein said local controller comprises software instructions, which when executed, configure said local controller to: operate the at least one output to indicate whether the sample head of the probe tube subassembly is in the extended position or the retracted position in any of the foregoing embodiments.

The reactor sampling apparatus may include at least one fluid sensor located within the housing, a local controller located within the housing and in electronic communication with the at least one fluid sensor, said local controller comprising software instructions, which when executed, configure said local controller to: receive data from the at least one fluid sensor, and determine whether fluid is present within the housing based on the data from the at least one fluid sensor in any of the foregoing embodiments.

In another exemplary embodiment, a reactor sampling system includes the reactor sampling apparatus of any of the foregoing embodiments and a first, second, third, and fourth servicing tool for servicing the reactor sampling apparatus.

The first servicing tool may comprise a clamping mechanism configured to clamp onto an outer surface of the sample head, the third servicing tool may comprise a clamping mechanism configured to clamp onto an outer surface of the retaining sleeve, the second servicing tool may be configured to be secured within the inner sleeve by engagement to the drive shaft, and the fourth servicing tool may be configured to fit about an outer surface of the inner sleeve.

In another exemplary embodiment, a method for operating the reactor sampling apparatus of any of the foregoing embodiments includes placing the distal end portion of the probe tube subassembly within a reactor while a reaction is underway, placing the sample head in the extended position to gather a sample of the reaction, and placing the sample head in the retracted position to secure the sample.

The method may further include charging the reactor sampling apparatus with a quench solution after placing the sample head in the extended position, and after placing the sample head in the retracted position, passing the quench solution into the pocket.

In another exemplary embodiment, a method of servicing using the reactor sampling system of any of the foregoing embodiments includes placing the sample head in the extended position, securing the first servicing tool to an outer surface of the sample head while the sample head is in the extended position, removing the sample head using the first servicing tool, including by rotating the first servicing tool while clamped to the outer surface of the sample head and sliding the sample head out of the inner sleeve, placing the second servicing tool within the inner sleeve and engaging the second servicing tool to the drive shaft, securing the third servicing tool to an outer surface of the retaining sleeve while the second servicing tool remains connected to the drive shaft, removing the retaining sleeve using the third servicing tool while the second servicing tool remains connected to the drive shaft, including by rotating the third servicing tool while clamped to the outer surface of the retaining sleeve and sliding the retaining sleeve off of the inner sleeve, securing the fourth servicing tool to an outer surface of the inner sleeve while the second servicing tool remains within the inner sleeve, and removing the inner sleeve using the fourth servicing tool, including by sliding the inner sleeve off of the second servicing tool, while the second servicing tool remains connected to the drive shaft.

The method may further include removing the inner sleeve from the fourth servicing tool, securing a replacement inner sleeve within the fourth servicing tool, securing the replacement inner sleeve over the second servicing tool using the fourth servicing tool while the second servicing tool remains connected to the drive shaft, removing the fourth servicing tool from the inner sleeve while the second servicing tool remains connected to the drive shaft, reconnecting the retaining sleeve to the reactor sampling apparatus using the third servicing tool, including by sliding the retaining sleeve over the replacement inner sleeve and rotating the retaining sleeve while the third servicing tool remains secured to the retaining sleeve, and while the second servicing tool remains connected to the drive shaft, disengaging the second servicing tool from the drive shaft, and reconnecting the sample head to the reactor sampling apparatus using the first servicing tool, including by placing the sample head within the inner sleeve and rotating the first servicing tool while connected to the sample head.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein:

FIG. 2 is an exploded view of the sampler;

FIG. 3B is another perspective, exploded view of the probe tube subassembly of FIG. 3A;

FIG. 3C is a detailed, perspective, exploded view of the probe tube subassembly of FIG. 3A;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
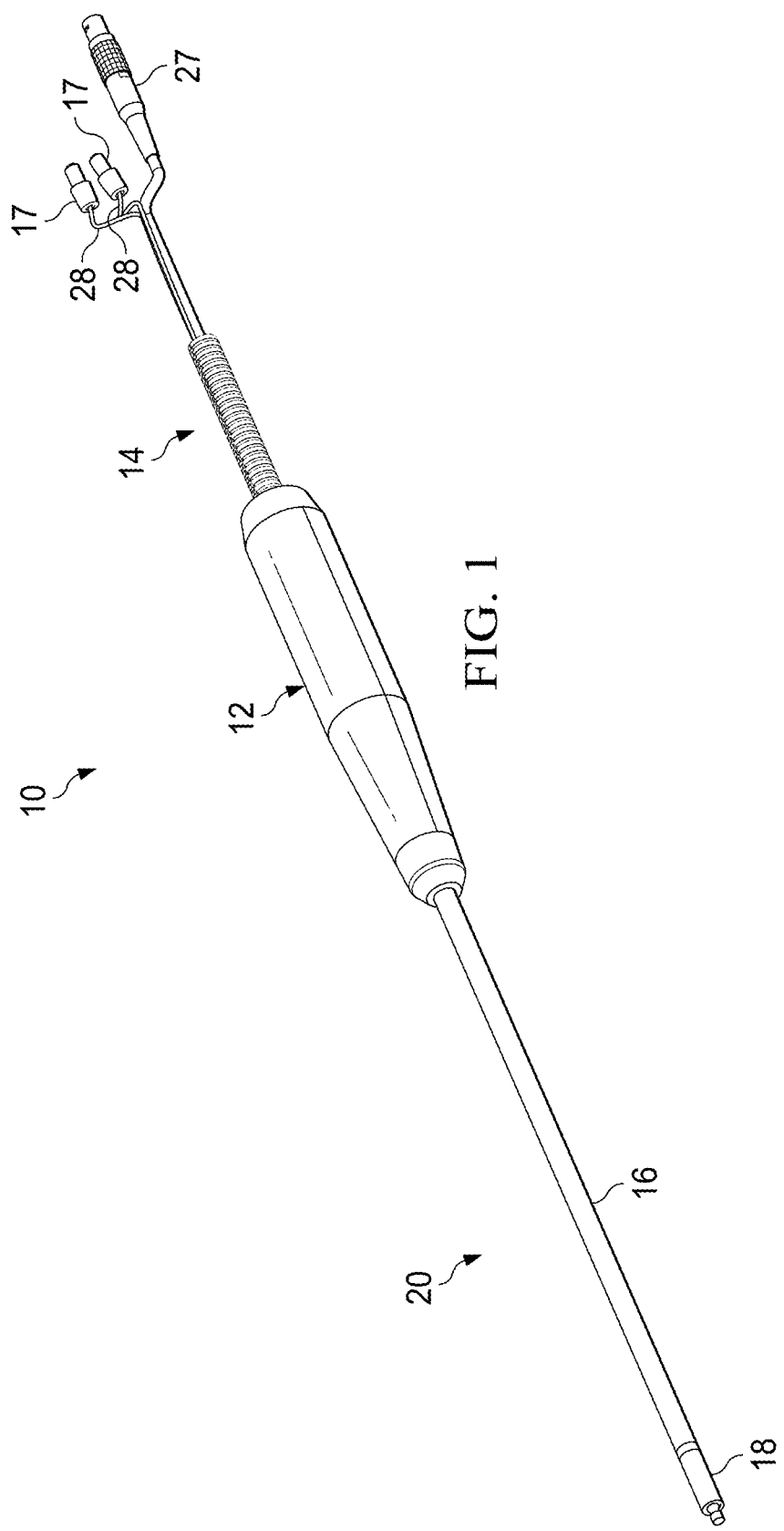
FIG. 1 is a perspective view of an exemplary sampler.

FIG. 1 illustrates an exemplary sampler 10, and FIG. 2 illustrates the sampler 10 in an exploded view. The sampler 10 includes a handle subassembly 12. A probe tube subassembly 20 extends from a first side (e.g., distal end) of the handle subassembly 12, and preferably at least partially within the same. A conduit 14 extends from a second, preferably opposing, side (e.g., proximal end) of the handle subassembly 12, and preferably at least partially within the same.

The conduit 14 may include and/or receive sample tubes 28 and/or tubes or other fluid passageways connected to the sample tubes 28, which may instead terminate inside the handling subassembly 12, by way of non-limiting example. Fluid connectors 17 may be provided at exposed, distal ends of each of the sample tubes 28 or connected fluid passageways, such as for connecting the sample tubes 28 to external fluid supplies, storage containers, repositories, analytical devices, combinations thereof, or the like. The conduit 14 may include and/or receive electrical connector(s) 27, which may extend therethrough and may be exposed at a distal end thereof. The electrical connector(s) 27 may include wiring with one or more adapters provided at a distal, exposed end of the wiring, such as for connecting to one or more external electrical supplies, electronic data connections, combinations thereof, or the like. Various number and/or type of fluid and/or electrical connectors, 17, 27 may be utilized.

The probe tube subassembly 20 may comprise a probe tube 16. A first and second housing component 13A, 13B may be assembled about a proximal end of the probe tube 16. At least the first and second housing components 13A, 13B may provide surfaces for a user to manually grasp and/or manipulate the sampler 10. A first end cap 11A may be provided along the probe tube 16 and may be securable to the first and second housing components 13A, 13B when assembled.

A second end cap 11B may be provided along the conduit 14 and may be securable to the first and second housing components 13A, 13B when assembled. When assembled, the first and second housing components 13A, 13B and the first and second end caps 11A, 11B may at least substantially surround and/or enclose an actuator subassembly 52 and/or a local controller 24.

Sometimes, the first and second housing component 13A, 13B along with the first and second end caps 11A, 11B may be collectively referred to as the "housing 13". The housing 13 may be provided in various shapes and/or sizes and may comprise various number of components which are connectable together, such as by way of fasteners, snap fit, frictional engagement, mating protrusions and recesses, combinations thereof, or the like.

The local controller 24 may comprise one or more printed circuit boards (PCBs), non-transitory electronic storage devices, processors, combinations thereof, or the like. The actuator subassembly 52 may be operationally controlled by the local controller 24.

The probe tube subassembly 20 may further include a retaining sleeve 18 located at a distal end of the probe tube 16, an inner sleeve 26 located within the retaining sleeve 18 (as further described herein), and a sample head 30 which is moveable axially within at least the inner sleeve 26, such as by way of sliding movement, to as to selectively expose a distal end portion thereof.

The actuator subassembly 52 may be mechanically connected to the sample head 30, such as by way of a drive shaft 36, which may extend within at least the probe tube 16, to move the sample head 30 between an extended and retracted position as further described herein. Other intermediary components may be utilized (e.g., connections, gears, linkages, cams, springs, levers, combinations thereof, or the like).

The handling subassembly 12 may include one or more brackets 58 for creating mechanical actuation limits, mechanically securing components thereof. Alternatively, or additionally, threaded connections, fasteners, adhesive, bonding, welding, integral formation, snap fit, interference fit, friction fit, combinations thereof, or the like, may be utilized to secure certain components of and/or connected to the handling subassembly 12 to one another.

The handling subassembly 12 may include one or more gaskets 56 for providing a level of sealing (e.g., liquid tight) within handling subassembly 12.

Figure 3A:
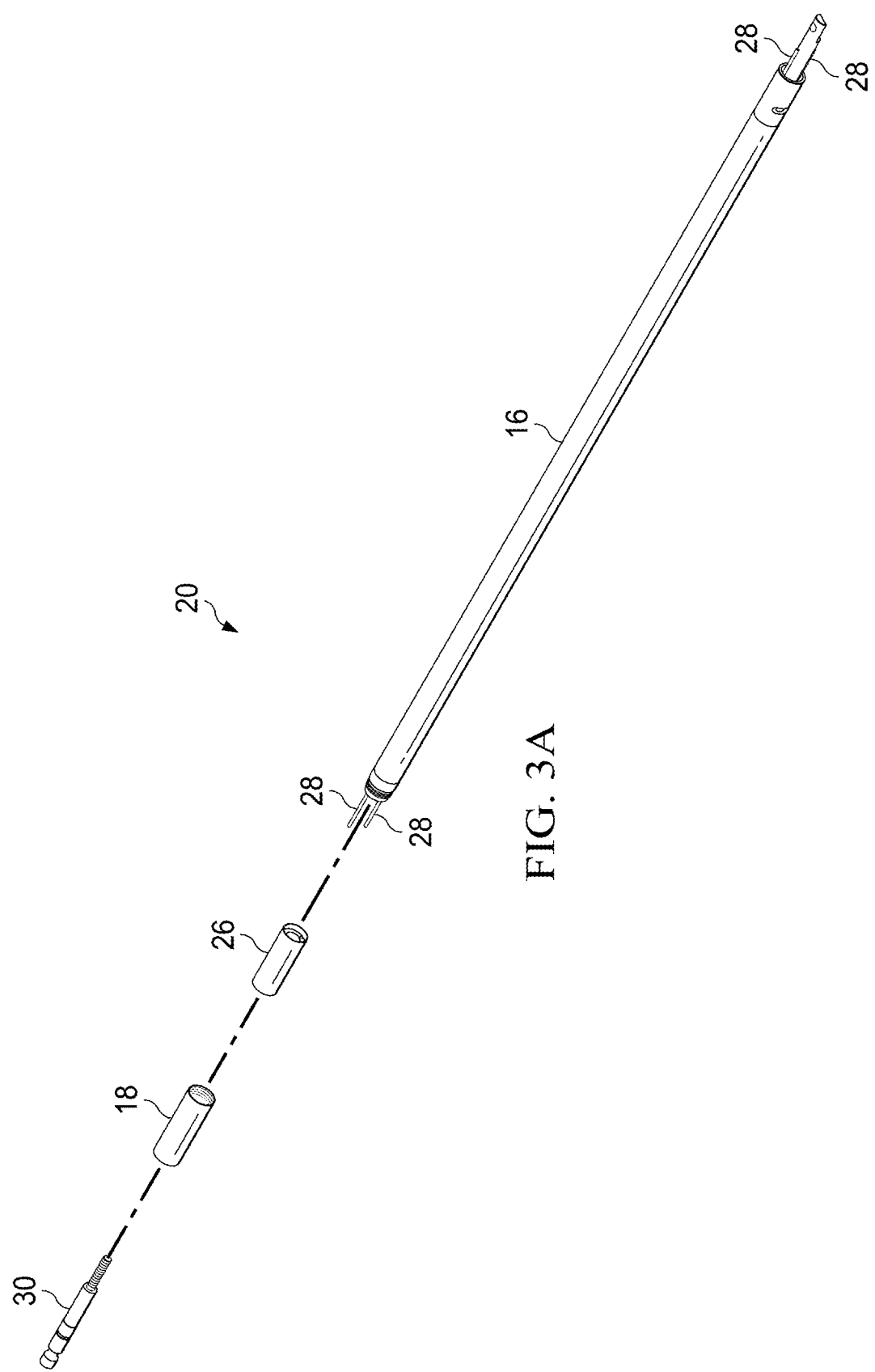
FIG. 3A is a perspective, exploded view of a probe tube subassembly of the sampler of FIG. 1.

FIG. 3A through FIG. 3C illustrates portions of the probe tube subassembly 20 in an exploded view. The inner sleeve 26 may fit within the retaining sleeve 18. The inner sleeve 26 may comprise a hollow, cylindrical shape. The retaining sleeve 18 may comprise a hollow, cylindrical shape of larger dimension. The retaining sleeve 18 may limit radial expansion of the inner sleeve 26, such as to maintain a seal with the sample head 30. As further described herein, the retaining sleeve 18 may be engaged to the probe tube 16 at a proximal end of the retaining sleeve 18 (distal end of the probe tube 16) and may include a lip 21 extending about a distal end of the retaining sleeve 18, such as to mechanically engage a distal end of the inner sleeve 26, thereby retaining the same.

The inner sleeve 26 may comprise apertures 23 for receiving the sample tubes 28. The apertures 23 may comprise through holes providing tubular shaped channels extending through the inner sleeve 26. In this way, the inner sleeve 26 may be separable from the sample tubes 28.

The sample tubes 28 may extend through some or all of the probe tube 16 and/or the handling subassembly 12, such as to and/or through the conduit 14. In this way, the number and/or severity of bends and/or junctions may be reduced, thereby reducing turbulence and/or improving fluid flow through the sampler 10, and particularly the sample tubes 28. For example, without limitation, the sample tubes 28 may extend in a straight, or at least substantially (e.g., +\-20%) straight, line through at least the probe tube 16.

The inner sleeve 26 may comprise and/or consist of polytetrafluoroethylene (PTFE). The properties of PTFE, including but not necessarily limited to chemical compatibility and low friction, may be particularly advantageous in the desired application of the sampler 10 for relatively extreme and/or varying conditions. However, the substantial change of elasticity and yield strength with temperature provided by PTFE may limit the effective operational temperature range of the inner sleeve 26 without the additional support, containment, and/or other features provided by these disclosures.

The sample tubes 28 may comprise and/or consist of metal. This may increase strength and/or rigidity of the sampler 10, the sample tubes 28, and/or the inner sleeve 26 when secured to the sampler 10. This may compensate for the material properties of the preferably PTFE inner sleeve 26. Additional, optionally non-metallic, tubes may be part of and/or connected to the sample tubes 28, such as at and/or beyond the handle subassembly 12 (e.g., at or through the conduit 14) and may be fluidly connected to the sample tubes 28. This may permit more flexible connections further from the reactor when the sampler 10 is in use.

Figure 3D:
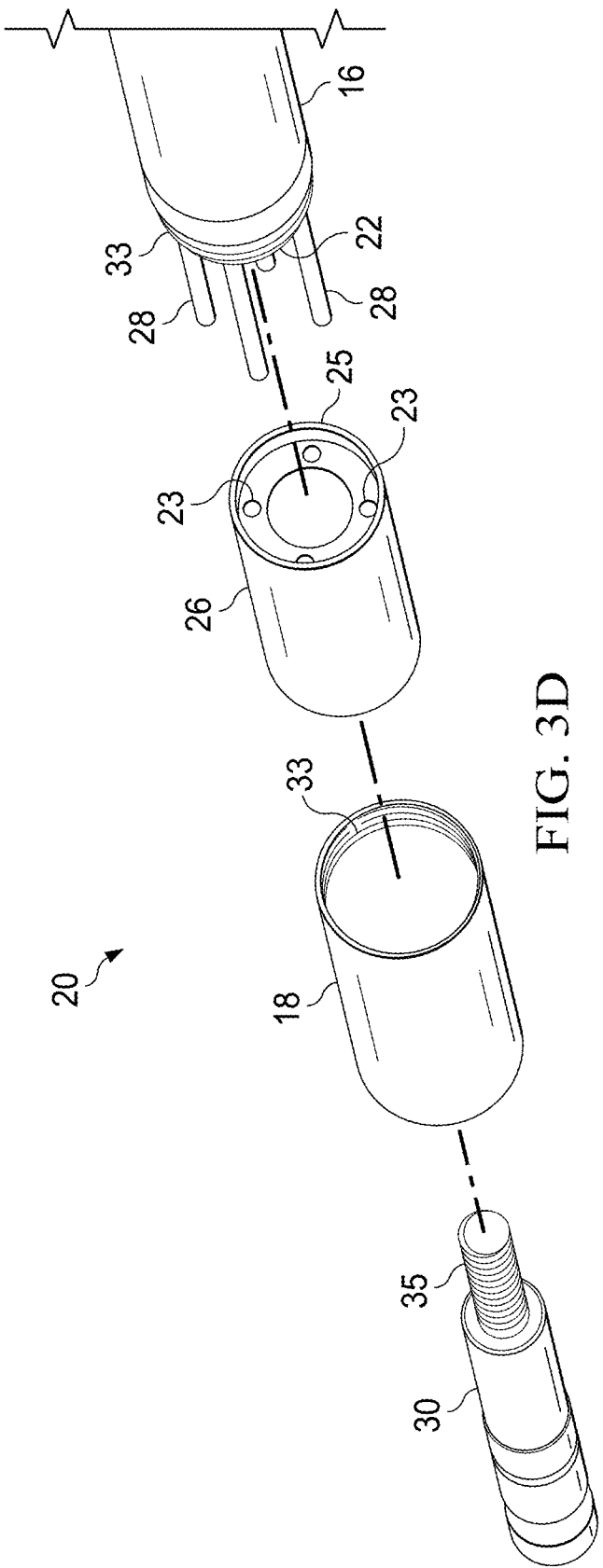
FIG. 3D is a detailed, perspective, exploded view of another exemplary embodiment of the probe tube subassembly of FIG. 30.

As further illustrated with particular regard to FIG. 3D, various number of sample tubes 28 and apertures 23 may be provided (e.g., 2, 4, 6, 8, etc.).

The inner sleeve 26 may comprise a protruding lip 25, which may extend about inner sleeve 26 and/or may extend beyond the apertures 23. The protruding lip 25 may be securable over an extending portion 22 of the probe tube 16, the interface component 29 (where utilized), and/or drive shaft 36, such as to provide a seal (e.g., liquid tight) and/or an interference fit, particularly as the retaining sleeve 18 is threaded or otherwise connected to the probe tube 16.

Referring additionally to FIG. 4A through FIG. 5B, the retaining sleeve 18 may be connected to the probe tube 16 by mating threads 33, in exemplary embodiments. Alternatively, or additionally, an interface component 29 may be interposed between the retaining sleeve 18 and the probe tube 16, which may comprise some of the mating threads 33. Other types and/or kinds of connections may be utilized, such as but not limited to, friction fit, press fit, mating slot and protrusion, fasteners, combinations thereof, or the like.

The inner sleeve 26 may include and/or define a through passage 32, preferably extending along a centerline of the inner sleeve, for accommodating the sample head 30. A proximal portion of the sample head 30 may extend from a proximal end of the inner sleeve 26 and may include a threaded portion 35 for connecting to threads of the drive shaft 36, though other types and kinds of connections may be utilized such as but not limited to, snap fit, friction fit, interference fit, fasteners, combinations thereof, or the like.

Figure 5A:
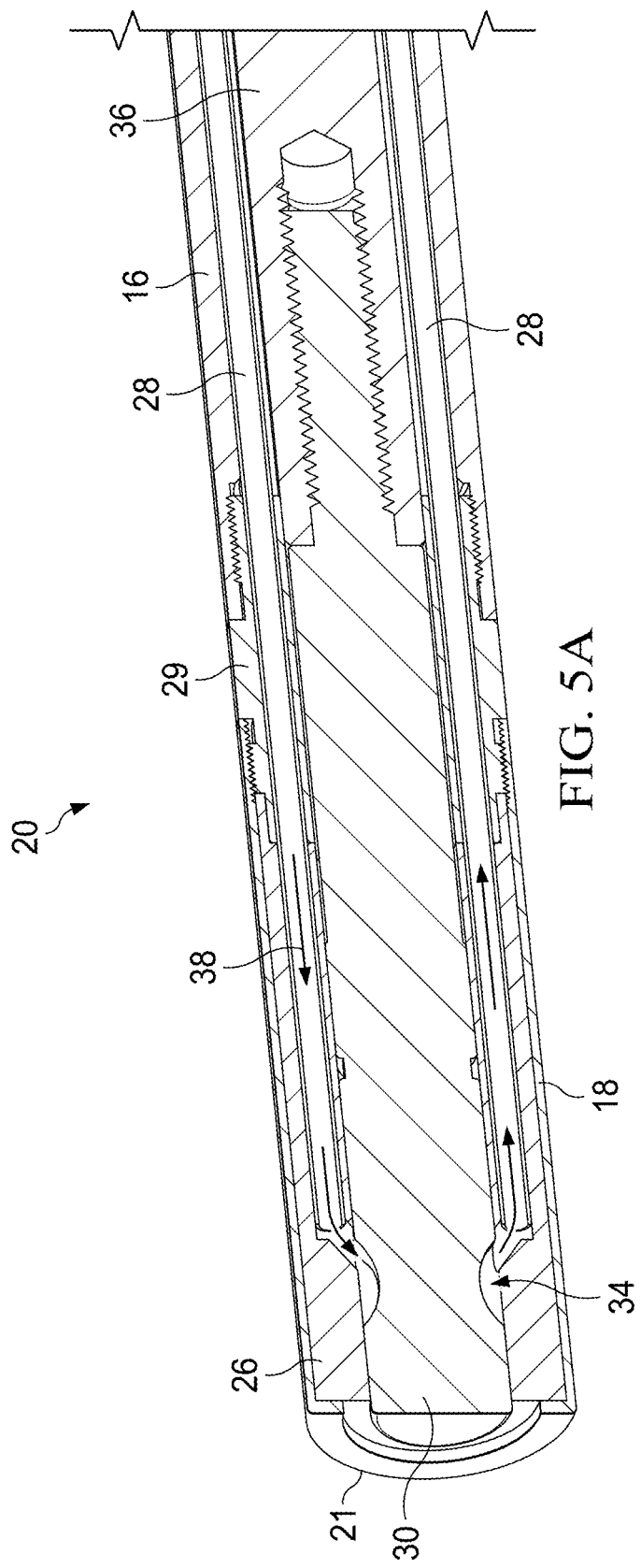
FIG. 5A is a perspective, sectional view of the probe tube subassembly of the sampler of FIG. 1 with an exemplary sample head in an exemplary retracted position.
Figure 5B:
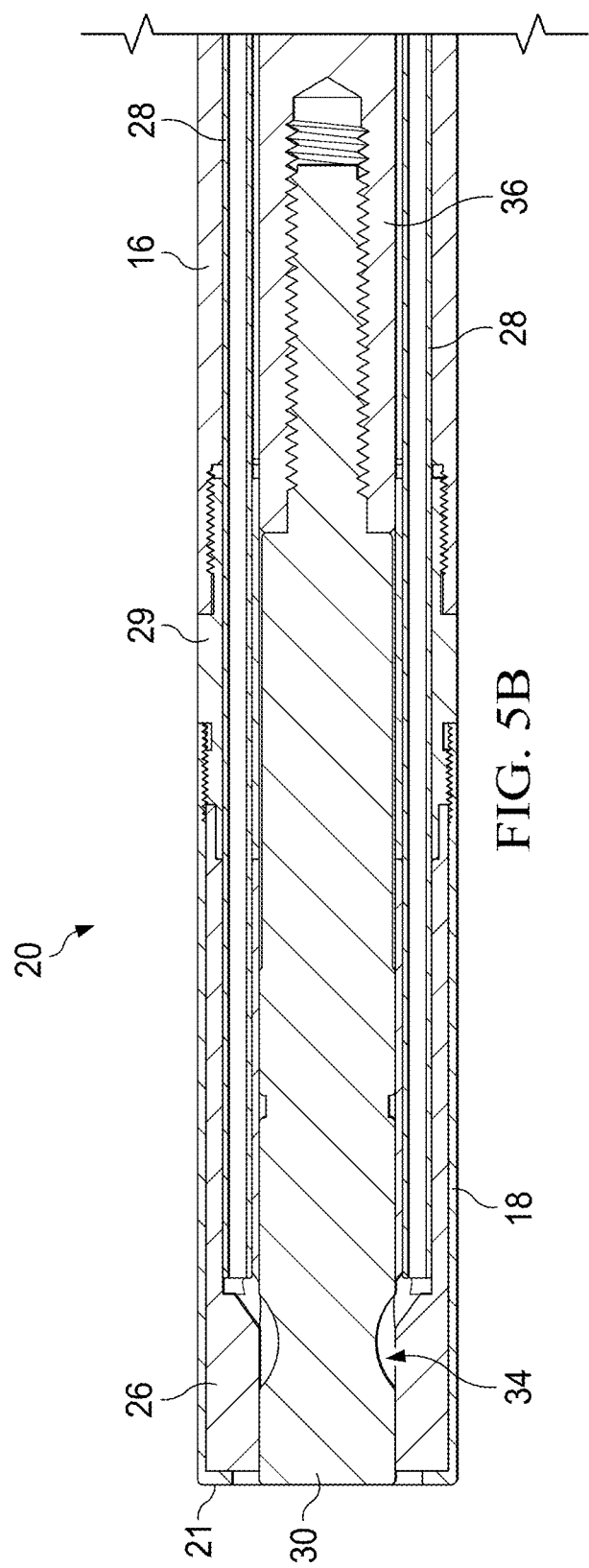
FIG. 5B is a side, sectional view of the probe tube subassembly of the sampler of FIG. 5A.

A distal portion of the sample head 30 may fit snugly within the through passage 32 when the sample head 30 is in a retracted position, such as shown in FIGS. 5A and 5B, to seal, or substantially seal (e.g., liquid tight and/or gas tight), the sampler 10. A distal end of the sample head 30 may be flush with, or at least substantially (e.g., within 5 mm) flush with a distal end of the inner sleeve 26 when the sample head 30 is in the retracted position.

Figure 4A:
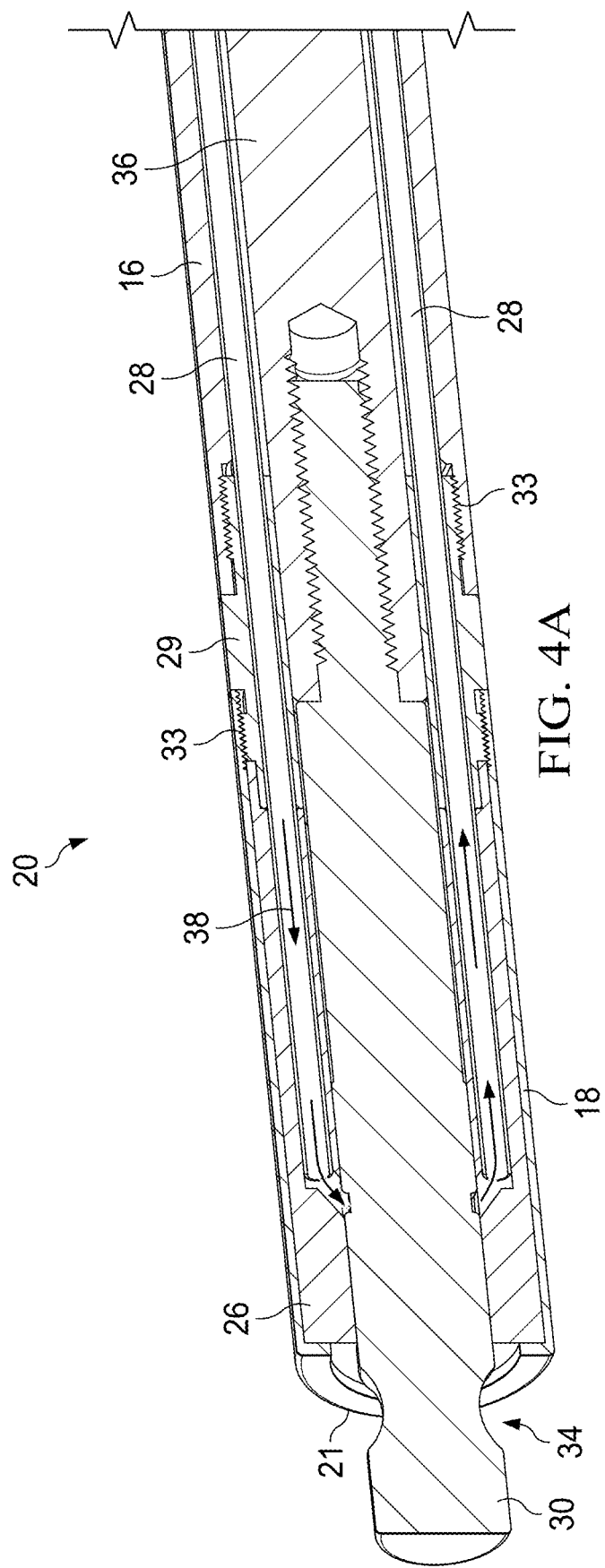
FIG. 4A is a perspective, sectional view of the probe tube subassembly of the sampler of FIG. 1 with an exemplary sample head in an exemplary extended position.
Figure 4B:
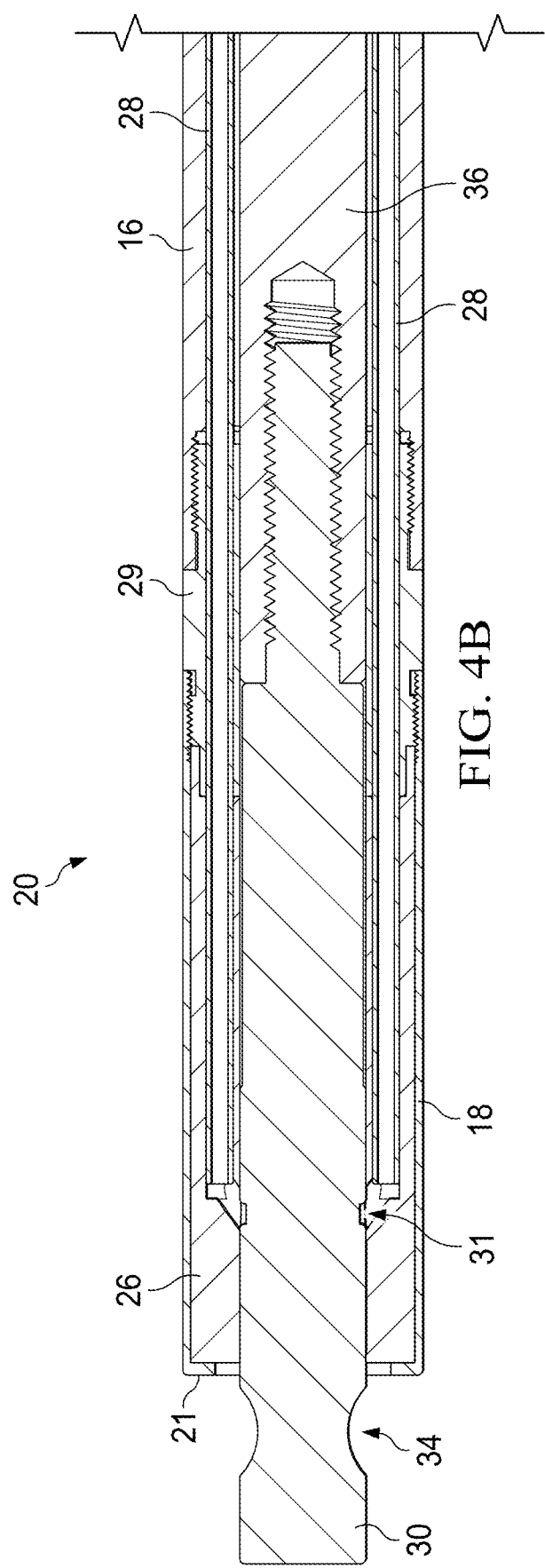
FIG. 4B is a side, sectional view of the probe tube subassembly of the sampler of FIG. 4A.

A sample pocket 34 may be provided at the distal portion of the sample head 30, which may be spaced apart from a distal end of the sample head. When the sample head 30 is in an advanced or extended position, such as shown in FIGS. 4A and 4B, the pocket 34 may be exposed to capture a sample, such as of reactor fluid. Optionally, the pocket 34 may be provided with a dosing material for the reactor while in the retracted position. The sample head 30 may be extended while the pocket 34 contains the dosing material, thereby adding the dosing material to the reactor, and a sample may be retrieved thereafter, such as by placing the sample head 30 in the retracted position.

Figure 6:
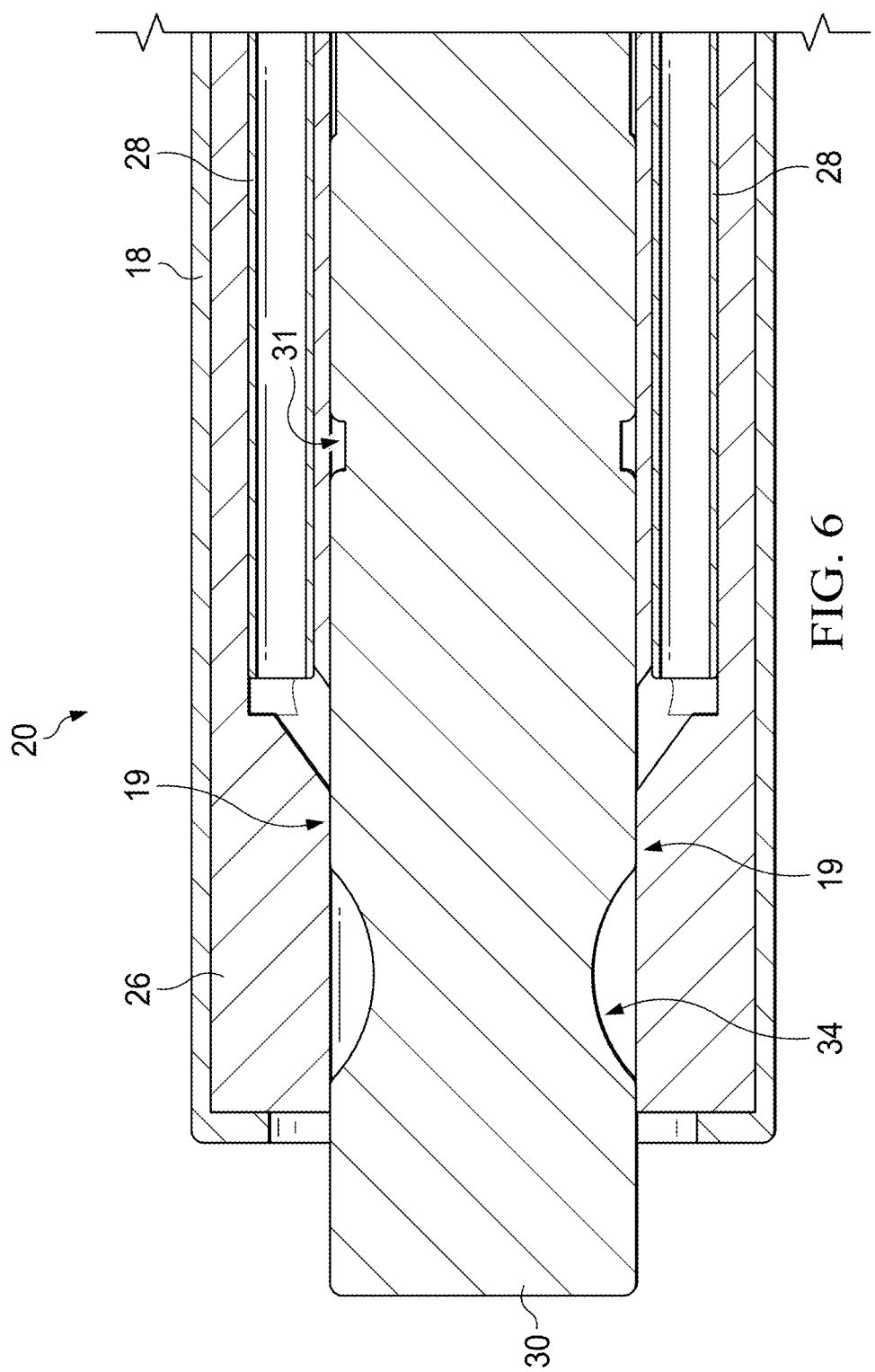
FIG. 6 is a side, sectional view of the sample end of the sampler of FIGS. 4A-5B in an exemplary partially extended position.
Figure 7A:
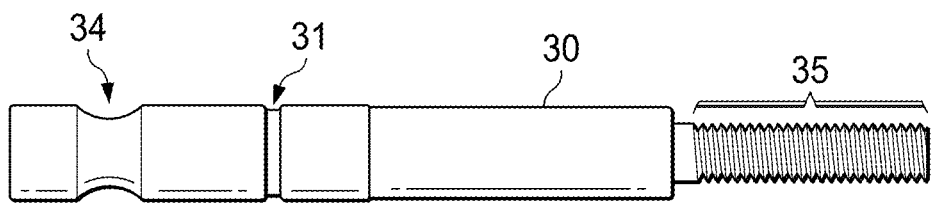
FIG. 7A is a side view of an exemplary sample head with an exemplary first size pocket for the sampler of FIGS. 1-6, illustrated in isolation.
Figure 7B:
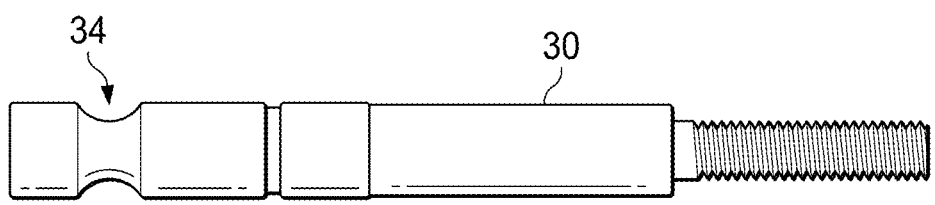
FIG. 7B is a side view of the sample head of FIG. 7A with an exemplary second size pocket.
Figure 7C:
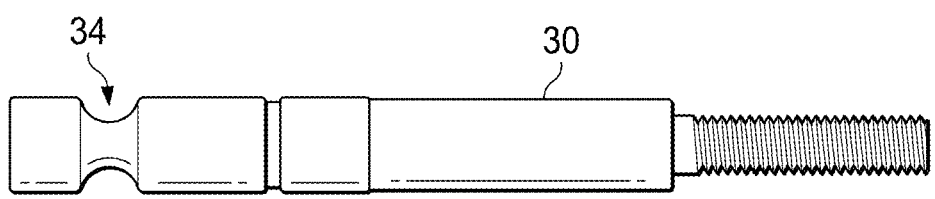
FIG. 7C is a side view of the sample head of FIG. 7A with an exemplary third size pocket.
Figure 7D:
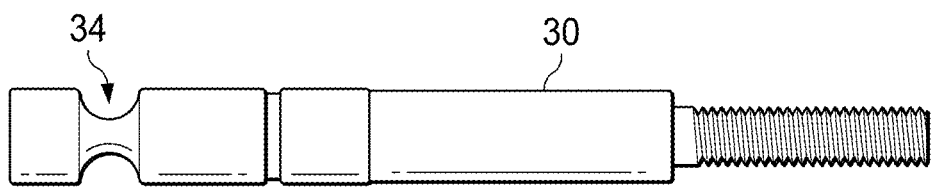
FIG. 7D is a side view of the sample head of FIG. 7A with an exemplary fourth size pocket.

As illustrated with particular regard to FIG. 6 at item 19, an interference fit may be provided between the inner sleeve 26 and the sample head 30. This may provide for sealing (e.g., gas and/or liquid tight) of the sampler 10 when the sample head 30 is in the retracted position. In exemplary embodiments, without limitation, the interference is between 0.5 and 2.5 mm, and more preferably about 1.5 mm, though other amounts of interference may be utilized.

The pocket 34 is preferably annular in shape. This may provide more even stress distribution and/or may facilitate formation in various sizes, such as illustrated with particular regard to FIG. 7A through FIG. 7D, by way of non-limiting example (e.g., 20 µL, 30 µL, 40 µL, 50 µL, etc.).

A channel 31, preferably in the form of an annular slot, may be provided at the sample head 30. The channel 31 may provide compressive relief, such as due to thermal expansion/contraction during use. The channel 31 may circumscribe an outer surface of the sample head 30 at a location proximal to, and spaced apart from, the pocket 34. As illustrated with particular regard to FIG. 4A-4B, the channel 31 may be located such that, when the sample head 30 is in the extended position, the channel 31 is aligned with a distal end of the sample tubes 28, thereby providing a fluid connection with the same. In this way, fluid 38 (e.g., quench, neutral solution, dilution fluid, and/or flushing/cleaning fluid) may be circulated through the sample tubes 28 while the sample head is in the extended position. This may allow, among other features, charging of quench fluid and/or cleaning/flushing the sampler 10.

As illustrated with particular regard to FIG. 5A-5B, when the sample head 30 is in the retracted position, the pocket 34 is aligned with a distal end of the sample tubes 28, thereby providing a fluid connection with the same. In this way, fluid 38 (e.g., quench, neutral solution, dilution fluid, and/or flushing/cleaning fluid) may instead be passed through the pocket 34, such as to remove the sample, dilute the sample, quench the sample, clean/flush the sampler 10 and/or sample head 30, combinations thereof, or the like.

The retaining sleeve 18, sample head 30, probe tube 16 and/or drive shaft 36 may comprise or consist of one or more metals, by way of non-limiting example. This may provide structural support, strength, and/or rigidity useful to operation at the relatively extreme and/or varying conditions intended.

Figure 8A:
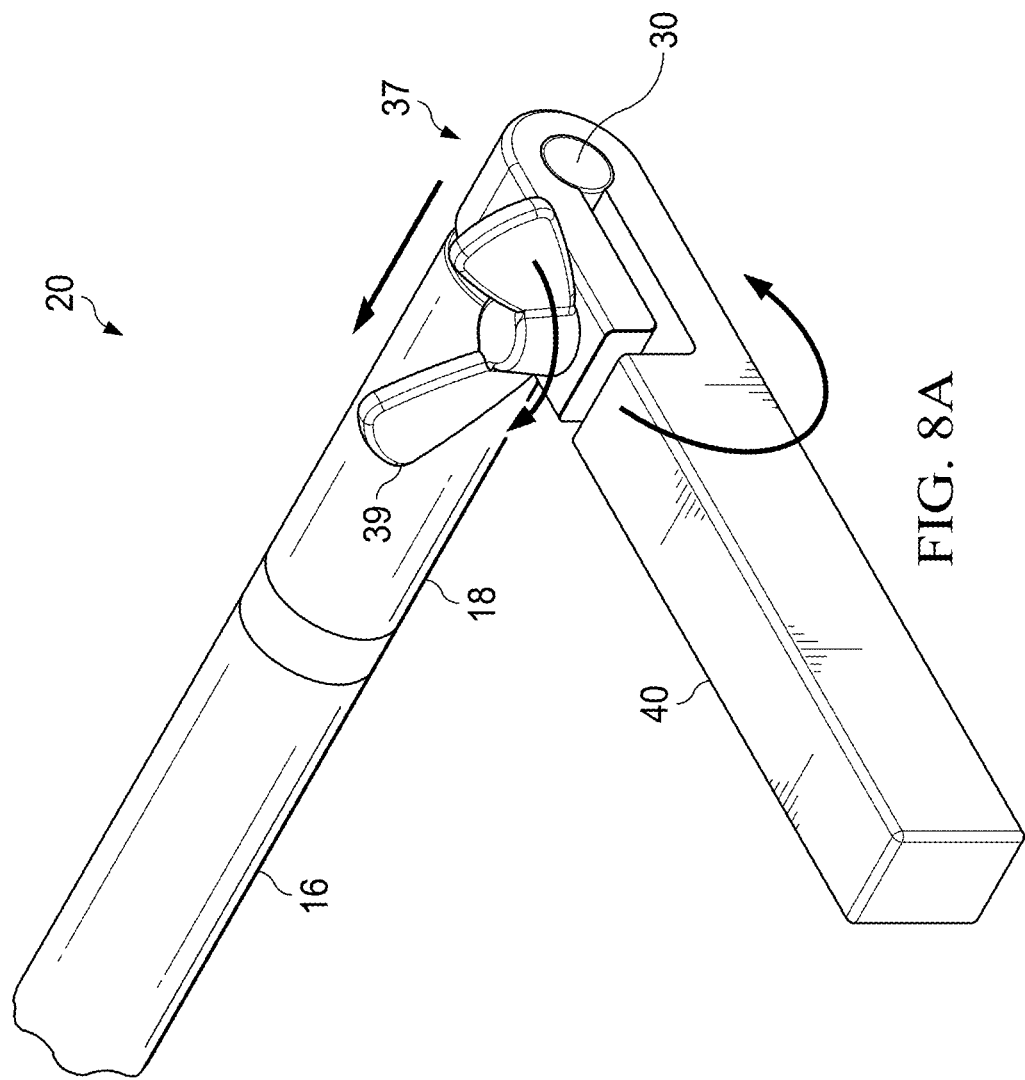
FIG. 8A is a detailed perspective view of the sampler of FIG. 1, and particularly a portion of the probe tube assembly thereof, with an exemplary first servicing tool in exemplary use.
Figure 8B:
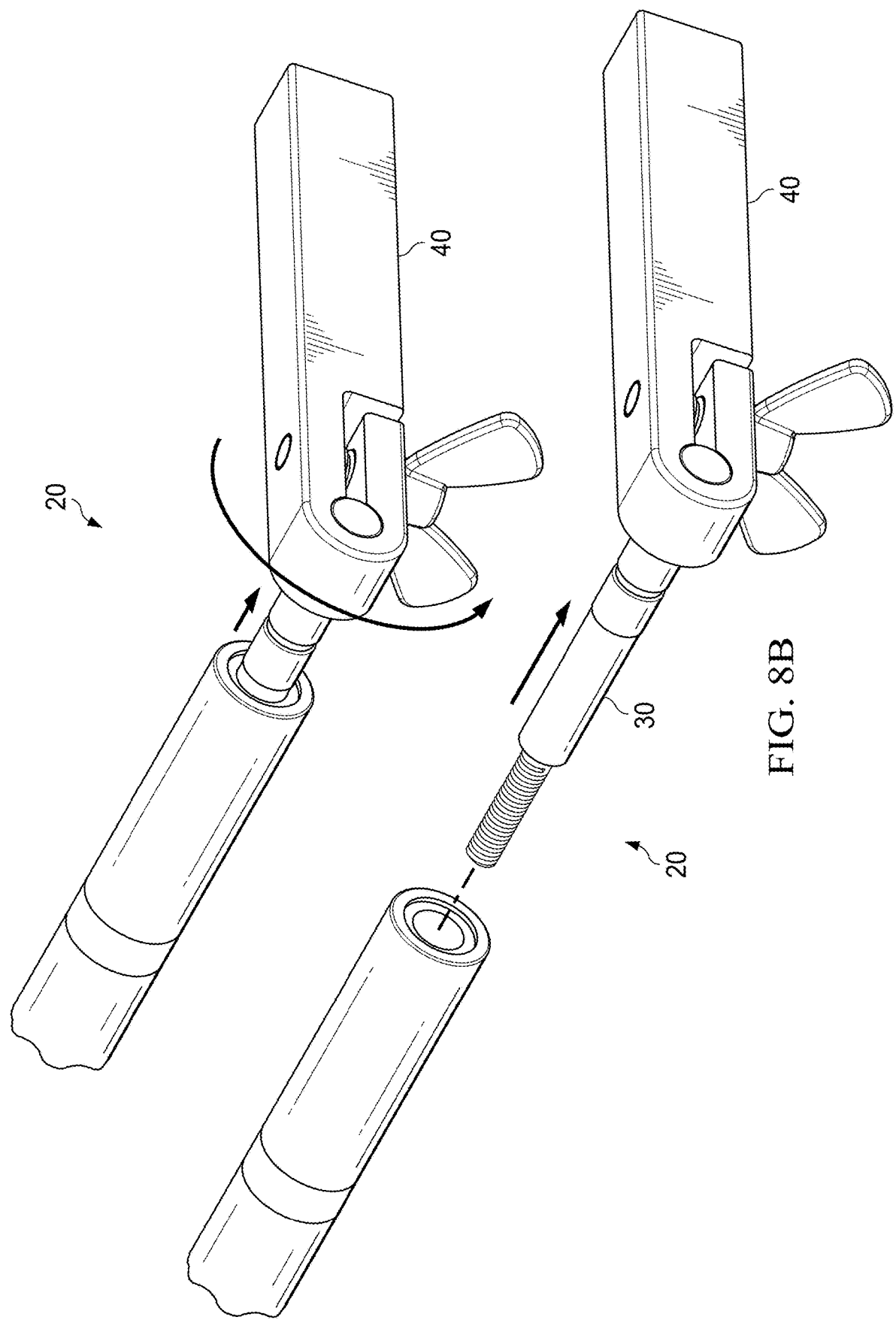
FIG. 8B is a perspective view of the probe tube subassembly of FIG. 8A with the first servicing tool in exemplary further use.

FIG. 8A through FIG. 8G, illustrate, in an exemplary stepwise fashion, a servicing method for the sampler 10. As illustrated with particular regard to FIG. 8A, the sample head 30 may be placed in the extended position. A first servicing tool 40 is secured to the distal end portion of the sample head 30, such as by way of a clamping mechanism 37 of the first servicing tool 40. The clamping mechanism 37 may include a fastener 39, such as a thumb screw, for clamping onto an outer surface of an extended portion of the sample head 30. The first servicing tool 40 is rotated, such as in a counterclockwise direction, while clamped, to unthread the sample head 30 from the drive shaft 36, thereby facilitating removal as depicted in FIG. 8B. In this way, the first servicing tool 40 may act as a wrench.

Figure 8C:
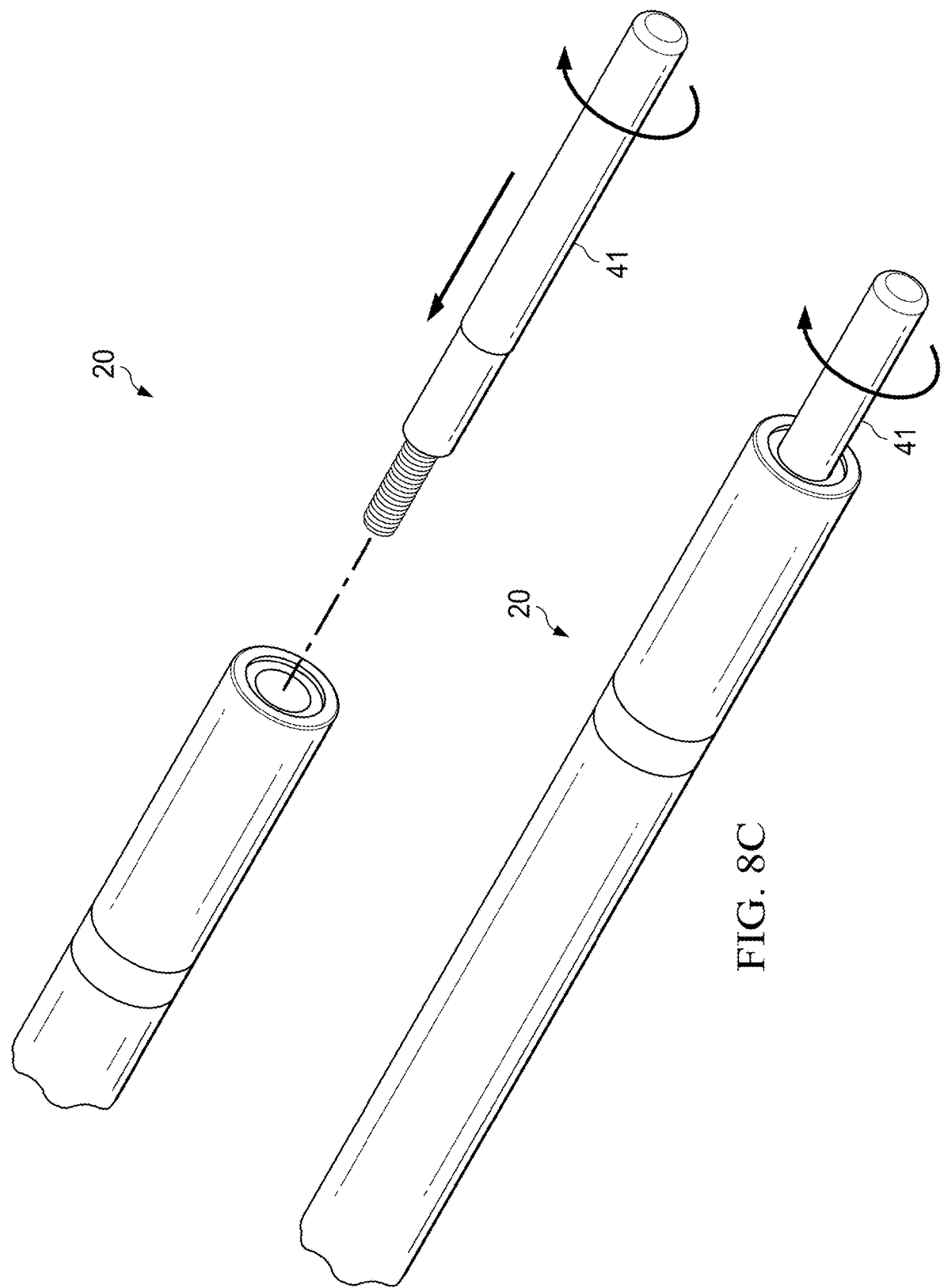
FIG. 8C is a perspective view of the probe tube subassembly of FIG. 8B with an exemplary second servicing tool in exemplary use.

As illustrated with particular regard to FIG. 8C, a second servicing tool 41 is inserted into the through passage 32 of the inner sleeve 26 and threaded to the drive shaft 36, such as to a finger tight fit. The second servicing tool 41 may serve to stabilize and/or inhibit or prevent deformation of the inner sleeve 26 and/or other components of the sampler 10 during servicing. In other exemplary embodiments, use of the second servicing tool 41 is optional.

Figure 8D:
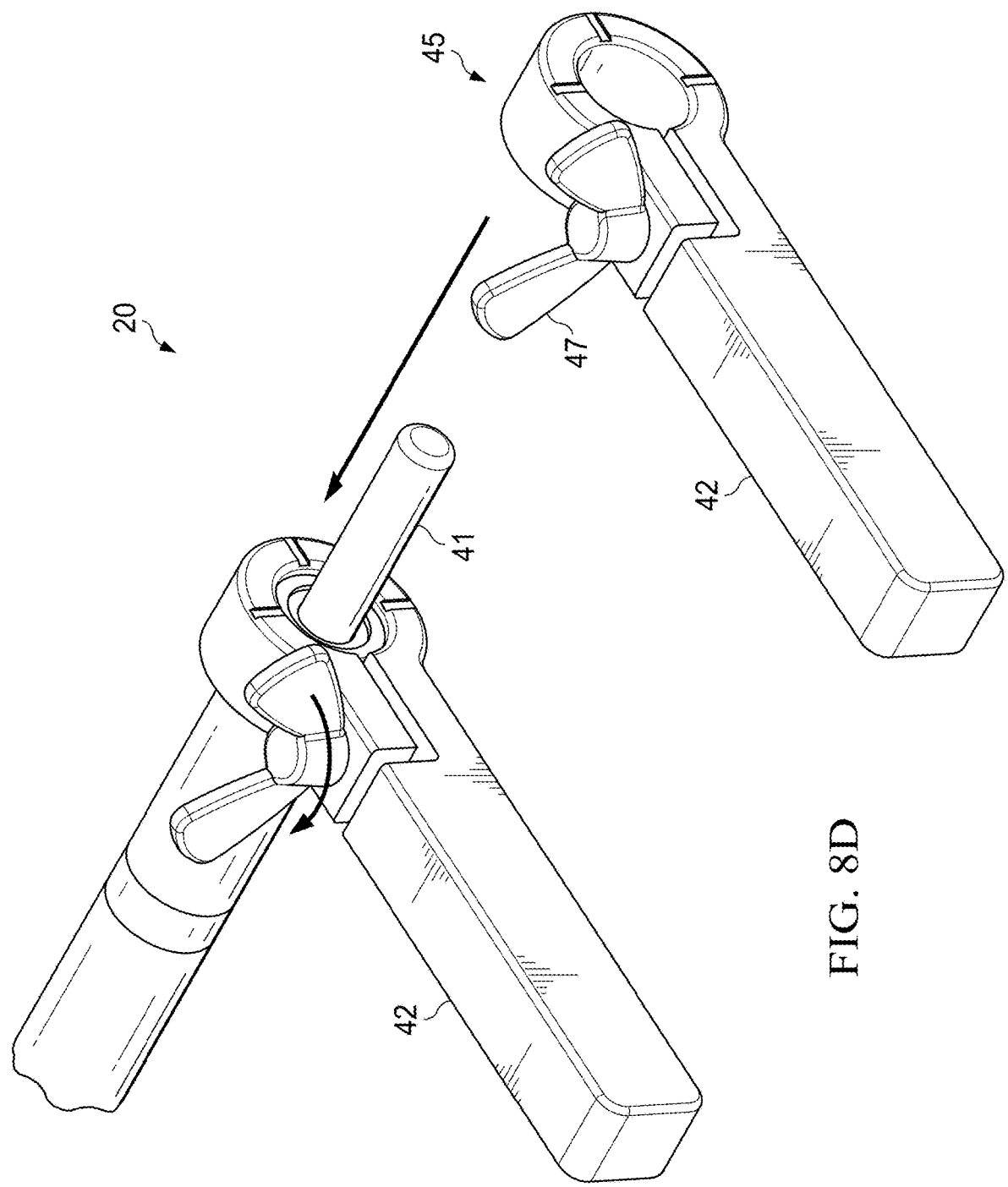
FIG. 8D is a perspective view of the probe tube subassembly of FIG. 8C with an exemplary third servicing tool in exemplary use.
Figure 8E:
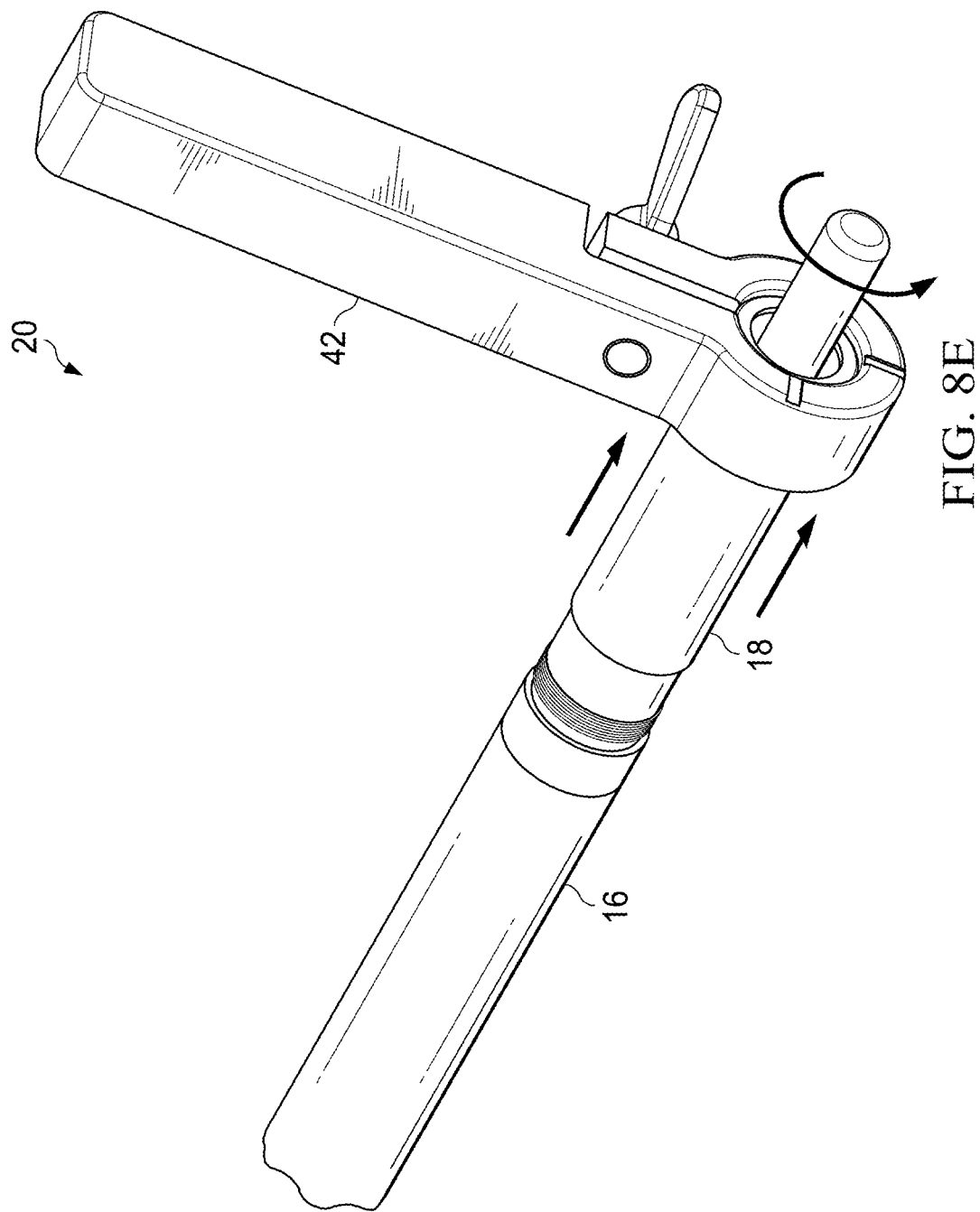
FIG. 8E is a perspective view of the probe tube subassembly of FIG. 8D with the third servicing tool in exemplary further use.

A third servicing tool 42 is secured to the retaining sleeve 18, such as by way of a clamping mechanism 45, at an outer surface thereof. The clamping mechanism 45 may include a fastener 47, such as a thumb screw, for clamping onto an outer surface of the second servicing tool 41. The third servicing tool 42 is rotated, while clamped, such as in a counterclockwise direction, and/or pulled to remove the retaining sleeve 18, thereby exposing the inner sleeve 26 as illustrated in FIGS. 8D-8E. In this way, the third servicing tool 42 may act as a wrench. In exemplary embodiments, the clamping mechanism of the third servicing tool 42 is sized to clamp onto the retaining sleeve 18 and is therefore larger, or capable of expanding larger, than the clamping mechanism of the first servicing tool 40 which is instead sized to clamp onto the sample head 30.

Figure 8F:
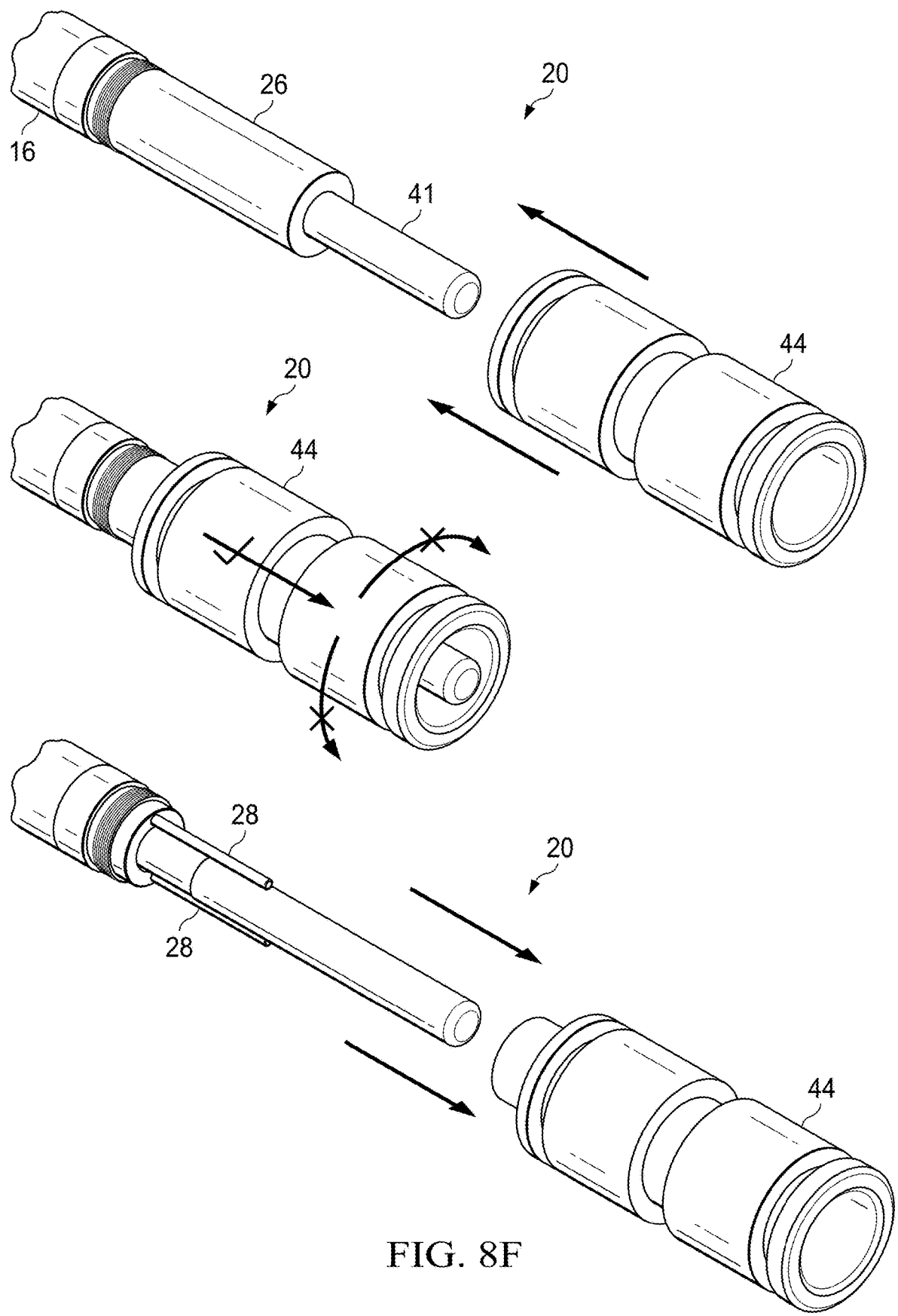
FIG. 8F is a perspective view of the probe tube subassembly of FIG. 8E with an exemplary fourth servicing tool in exemplary use.

As illustrated with particular regard to FIG. 8F, a fourth servicing tool 44 may be secured about an outer surface of the inner sleeve 26, such as by way of an interference fit. The fourth servicing tool 44 may be pulled, such as without rotation, to fit to and remove, respectively, the inner sleeve 26, thereby exposing the second servicing tool 41 and/or the sample tubes 28. The existing inner sleeve 26 may be removed from the fourth servicing tool 44, such as for replacement.

Figure 8G:
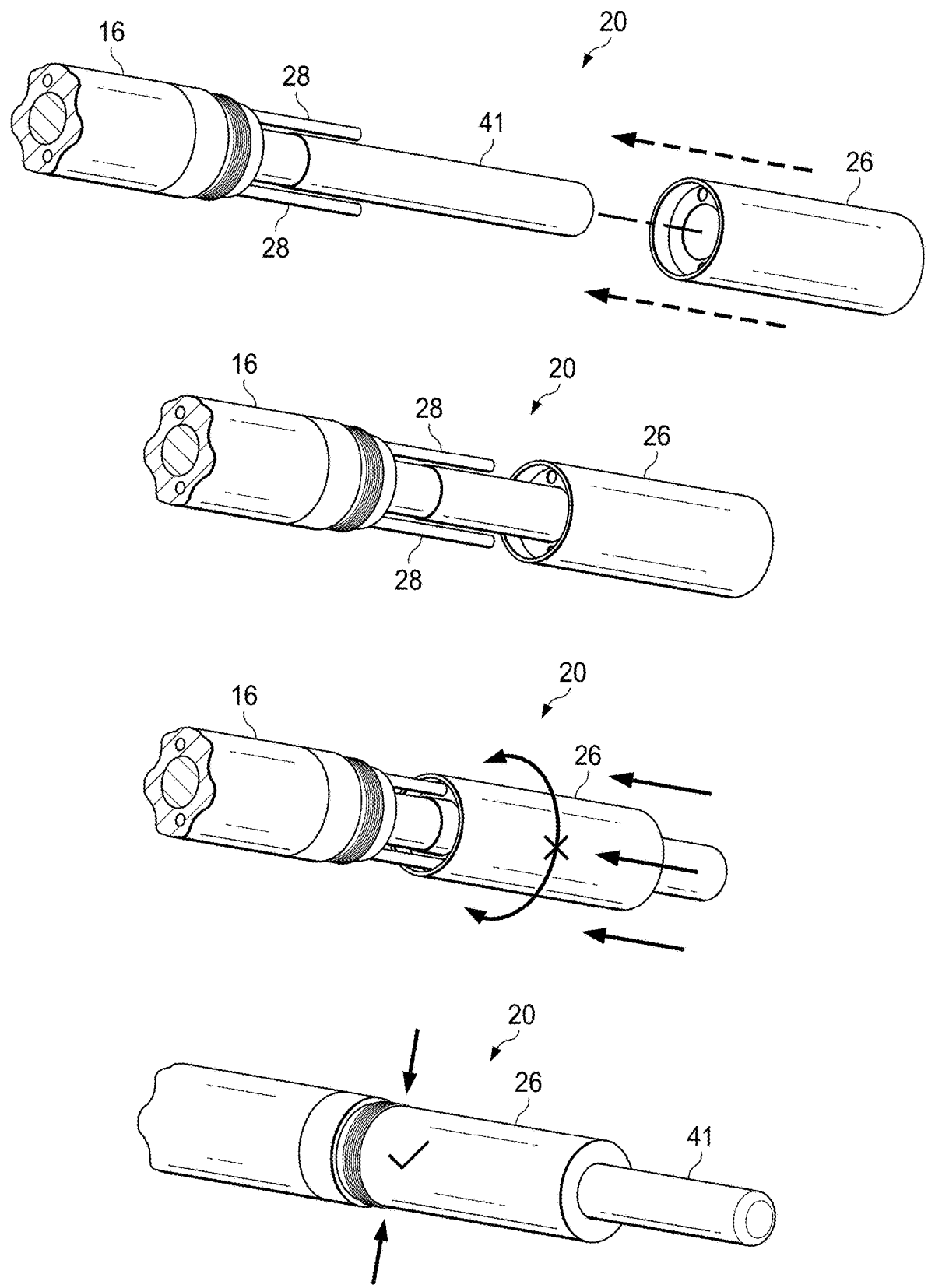
FIG. 8G is a perspective view of the probe tube subassembly of FIG. 8F with an exemplary new inner sleeve being installed.

As illustrated with particular regard to FIG. 8G, a new, repaired, and/or refurbished inner sleeve 26 may be placed at the second servicing tool 41. Alternatively, the same inner sleeve 26 may be reinstalled. The sample tubes 28 may be aligned with, and extended through, the apertures 23 in the inner sleeve 26, such as by way of manual alignment and sliding movement without rotation (after alignment). The replacement inner sleeve 26 may be firmly pushed onto the probe tube to seat it.

The steps depicted in at least FIGS. 8A-8G may be provided in reverse to reassemble the sampler 10.

Some or all of the steps may be performed to replace, clean, or otherwise service various parts of the sampler 10. The steps may be performed in other orders and/or with additional and/or omitted steps.

The rotations shown and/or described herein may be performed on a relative basis. For example, without limitation, where the first servicing tool 40 is depicted as the rotating element, instead, one or more components of a remainder of the probe tube subassembly 20 may instead be rotated. The rotations shown and/or described herein may be axial relative to a centerline of the probe tube subassembly 20.

Alternatively, a single servicing tool which is resizable may be used instead of one or more of the first, second and/or third servicing tools 40, 41, and/or 42.

Figure 9A:
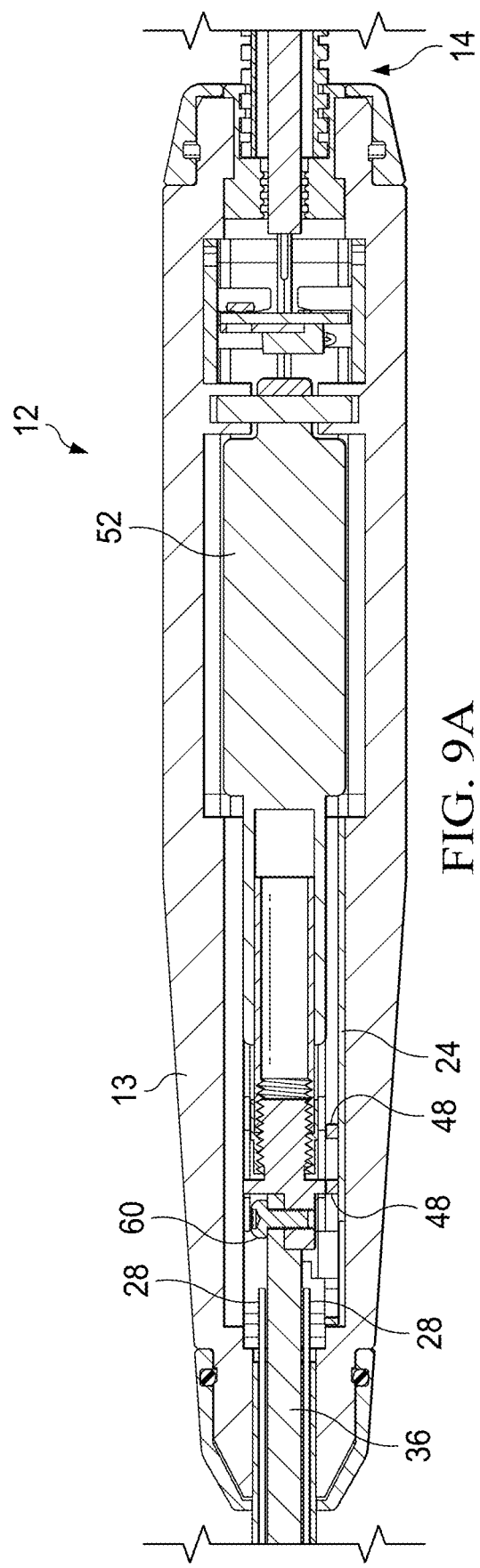
FIG. 9A is a detailed, side, sectional view of an exemplary handle subassembly of the sampler of FIG. 1.
Figure 9B:
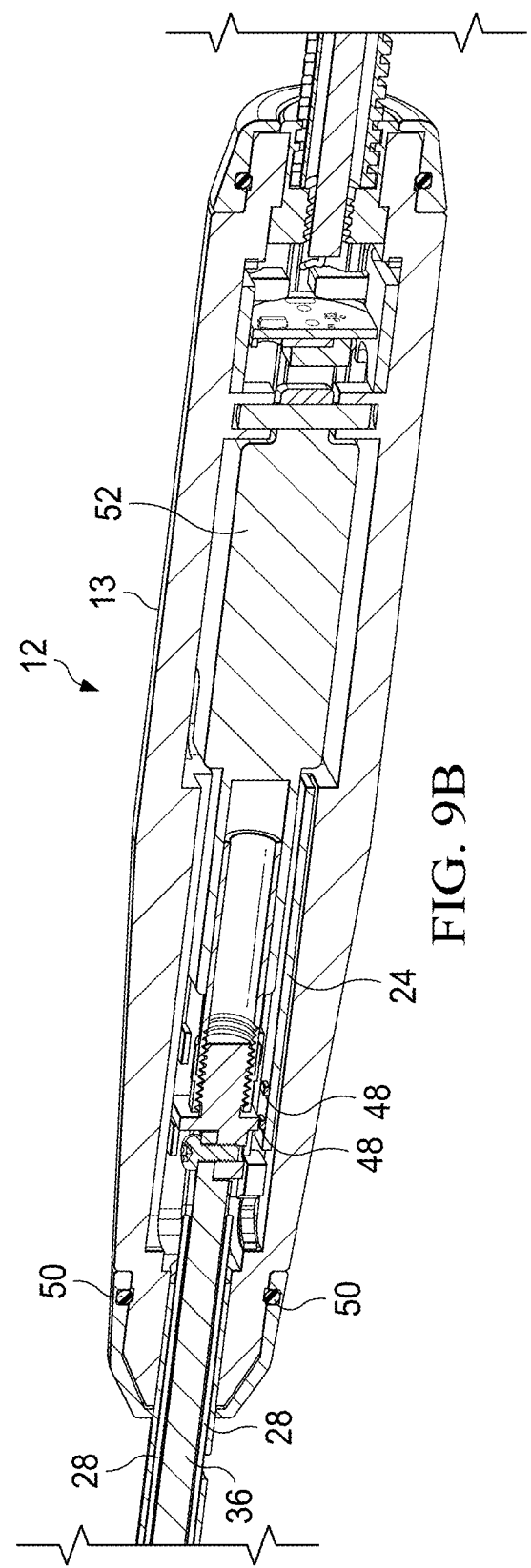
FIG. 9B is a perspective, side, sectional view of the handle subassembly of FIG. 9A.
Figure 9C:
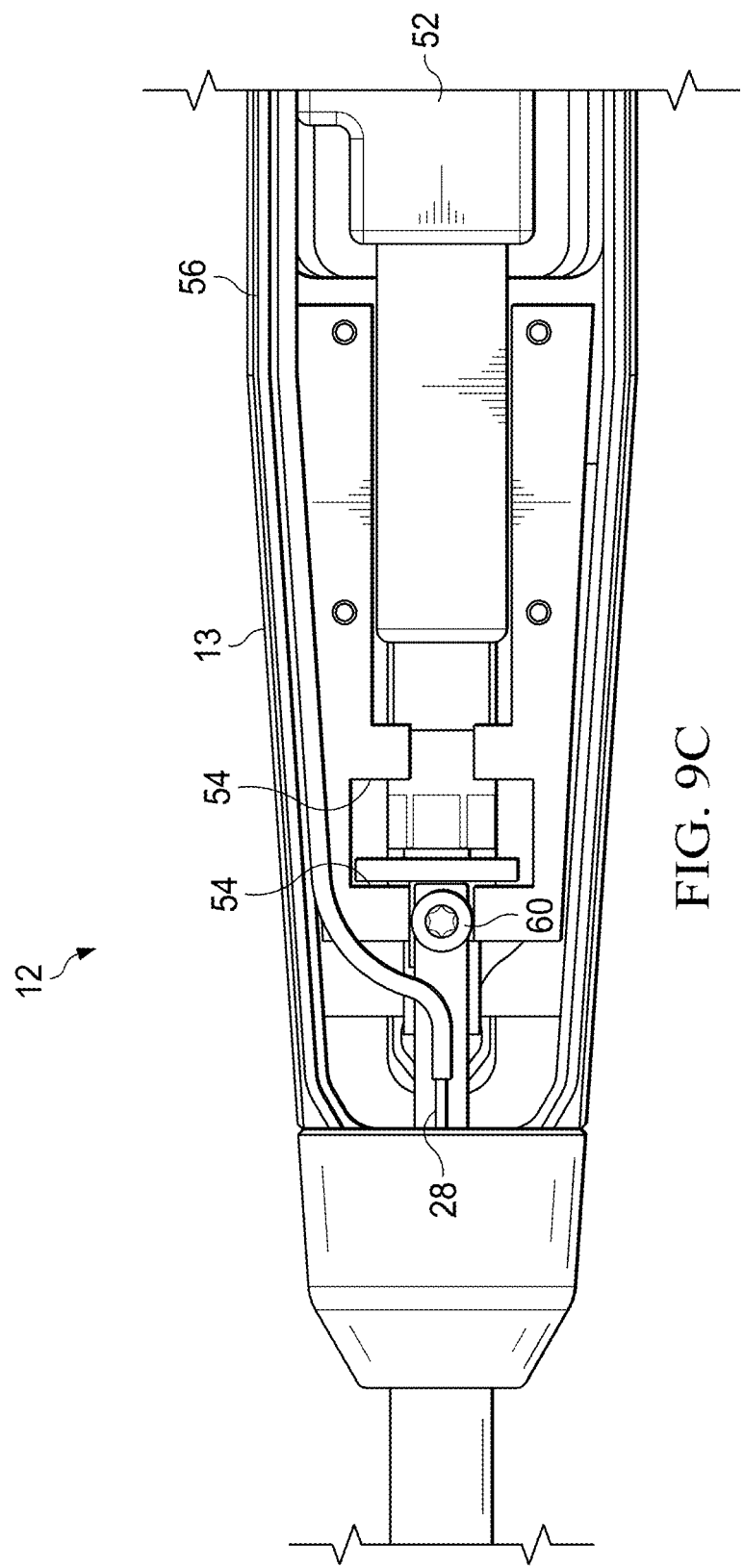
FIG. 9C is a detailed, top, sectional view of the handle subassembly of FIG. 9A.

FIG. 9A through FIG. 9C illustrate additional details of the handling subassembly 12. One or more optical sensors 48 may be provided, preferably within the housing 13 and along the drive shaft 36, actuator subassembly 52, and/or intermediary components. The optical sensor(s) 48 may be configured to detect travel of the drive shaft 36, actuator subassembly 52, and/or intermediary components, such as to determine if the sample head 30 is in the extended or retracted position. The optical sensor(s) 48 may be in electronic connection with the controller 24. The controller 24 may optionally be in electronic connection with one or more outputs (e.g., LEDs, electronic displays, remote electronic device), which may be provided at the handling subassembly 12 (e.g., at an outer surface of the housing 13) or elsewhere, to indicate, by way of the one or more outputs, whether the sample head 30 is in the extended or retracted position.

One or more fluid sensors 50 may be provided within the housing 13, such as proximal to the sample tube(s) 28 and/or the probe tube 16. The fluid sensor(s) 50 may be in electronic connection with the controller 24. The controller 24 may optionally be configured to indicate, by way of the one or more outputs, whether fluid is detected by the fluid sensor(s) 50.

The controller 24 may optionally be in electronic connection with the actuator subassembly 52. The controller 24 may optionally be configured to indicate, by way of the one or more outputs, a position of the sample head 30 (e.g., in the extended position or retracted position), such as based on data from the actuator subassembly 52.

The controller 24 may optionally be in electronic connection with other components, such as fluid reservoirs, pumps, valves, combinations thereof, or the like. The controller 24 may optionally be configured to indicate, by way of the one or more outputs, an operational state of the sampler 10 (e.g., sampling, quenching, flushing/cleaning, etc.), such as based on data from the same.

A portion of the housing 13 may provide mechanical stop(s) 54 to limit travel of the drive shaft 36 and/or related components.

A fastener 60, such as but not limited to a bolt, may secure the drive shaft 36 to the actuator subassembly 52, though other connections may be utilized (e.g., bonding, adhesive, other types of fasteners, welding, integral formation).

In exemplary embodiments, without limitation, the sampler 10 may be utilized by placing the distal end of the probe tube subassembly 20, including at least a distal end of the retaining sleeve 18, into a reactor. The sample head 30 may be placed in the extended position, such as by operation of the actuator subassembly 52, to capture reaction fluid. The sample head 30 may be placed in the retracted position, such as by operation of the actuator subassembly 52, to capture the reaction fluid. The reaction may be quenched with quench fluid circulated within the sampler 10. The quenching fluid is preferably charged before and/or while sampling such that the reaction may be rapidly quenched. Optionally, the quenched reaction fluid may be diluted, such as by circulating dilution fluid through the device. The sampler 10 may be flushed/cleaned with a cleaning/flushing fluid circulated within the sampler 10 to prepare the sampler 10 for reuse. The dilution and cleaning/flushing fluid may be the same or different.

While certain components are sometimes shown and/or described herein as being tubular in shape, and that is a preferred embodiment, other shapes may be utilized.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The features and/or functionality shown and/or described herein may be accomplished by way of stored, executable software instructions, such as in the form of applications, programs, routines, combinations thereof, or the like. The electronic devices may be general purpose computers or specialized computing devices. The electronic devices may comprise personal computers, smartphones, tablets, databases, servers, or the like. The electronic connections and transmissions described herein may be accomplished by one or more wired or wireless connectivity components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A probe tube subassembly for a sampling apparatus, said probe tube subassembly comprising:
   a probe tube;
   A retaining sleeve connected to a distal end of the probe tube;

an inner sleeve positioned within the retaining sleeve and comprising apertures;
sample tubes, each extending in an at least substantially straight line, including through the probe tube and into a respective one of the apertures; and
a sample head positioned within the inner sleeve and comprising a pocket located at a distal end portion thereof, wherein the sample head is axially slidable within the inner sleeve and relative to the sample tubes between an extended position where the pocket is exposed from the inner sleeve to an ambient environment, and a retracted position where the pocket is covered by the inner sleeve;
wherein a distal end of each of the sample tubes extends from the distal end of the probe tube and terminates adjacent to the pocket of the sample head when the sample head is in the retracted position.

2. The probe tube subassembly of claim 1 wherein:
the inner sleeve comprises polytetrafluoroethylene (PTFE); and
the sample tubes each comprise metal.

3. The probe tube subassembly of claim 1 wherein:
the pocket is annular in shape.

4. The probe tube subassembly of claim 3 wherein:
the sample head comprises a channel circumscribing an outer surface of the sample head;
the channel is spaced apart from the pocket and is located such that, when the sample head is in the extended position, the channel is fluidly connected to the sample tubes, and when the sample head is in the retracted position, the channel is fluidly separated from the sample tubes; and
the pocket is located such that, when the sample head is in the retracted position, the pocket is fluidly connected to the sample tubes, and when the sample head is in the extended position, the pocket is fluidly separated from the sample tubes.

5. The probe tube subassembly of claim 1 wherein:
the retaining sleeve comprises a lip for mechanically engaging a distal end of the inner sleeve;
the inner sleeve comprises a through passage for the sample head; and
the retaining sleeve is engaged to the probe tube by mating threads.

6. The probe tube subassembly of claim 5 further comprising:
a drive shaft extending within the probe tube, wherein the sample head is engaged to the drive shaft by mating threads.

7. The probe tube subassembly of claim 1 wherein:
the sample tubes consist of two sample tubes.

8. The probe tube subassembly of claim 1 wherein:
the inner sleeve comprises a protruding lip;
the probe tube comprises an extending portion; and
the protruding lip of the inner sleeve extends about the extending portion of the probe tube.

9. The probe tube subassembly of claim 1 wherein:
the sample tubes each extend through beyond a proximal end of the probe tube.

10. A reactor sampling apparatus, said apparatus comprising:
the probe tube subassembly of claim 1, and further comprising a drive shaft extending within the probe tube; and
a handling subassembly comprising a housing and an actuator subassembly located within the housing, wherein a proximal end of the probe tube extends within the housing of the handling subassembly, and the drive shaft is connected, directly or indirectly, to the actuator subassembly;
wherein operation of the actuator subassembly causes movement of the sample head between the retracted position and the extended position.

11. The apparatus of claim 10 further comprising:
at least one optical sensor located within the housing; and
a local controller located within the housing and in electronic communication with the actuator subassembly at the at least one optical sensor, said local controller comprising software instructions, which when executed, configure said local controller to:
command operation of the actuator subassembly;
receive data from the at least one optical sensor; and
determine whether the sample head of the probe tube subassembly is in the extended position or the retracted position in accordance with the data received from the at least one optical sensor.

12. The apparatus of claim 11 further comprising:
at least one output provided at said housing, wherein said local controller comprises software instructions, which when executed, configure said local controller to: operate the at least one output to indicate whether the sample head of the probe tube subassembly is in the extended position or the retracted position in accordance with the data received from the at least one optical sensor.

13. The apparatus of claim 10 further comprising:
at least one fluid sensor located within the housing;
at least one output provided at said housing; and
a local controller located within the housing and in electronic communication with the at least one fluid sensor, said local controller comprising software instructions, which when executed, configure said local controller to:
receive data from the at least one fluid sensor; and
determine whether fluid is present within the housing based on the data from the at least one fluid sensor; and
provide an output at the at least one output in accordance with the determination.

14. A reactor sampling system, said system comprising:
the reactor sampling apparatus of claim 10; and
a first, second, third, and fourth servicing tool for servicing the reactor sampling apparatus.

15. The system of claim 14 wherein:
the first servicing tool comprises a clamping mechanism configured to clamp onto an outer surface of the sample head;
the second servicing tool is configured to be secured within the inner sleeve by engagement to the drive shaft;
the third servicing tool comprises a clamping mechanism configured to clamp onto an outer surface of the retaining sleeve; and
the fourth servicing tool is configured to fit about an outer surface of the inner sleeve.

16. A method for operating the reactor sampling apparatus of claim 10, said method comprising:
placing the distal end portion of the probe tube subassembly within a reactor while a reaction is underway;
placing the sample head in the extended position to gather a sample of the reaction; and
placing the sample head in the retracted position to secure the sample.

17. The method of claim 16 further comprising:
charging the reactor sampling apparatus with a quench solution after placing the sample head in the extended position; and
after placing the sample head in the retracted position, passing the quench solution into the pocket.

18. A method of servicing using the reactor sampling system of claim 14, said method comprising:
placing the sample head in the extended position;
securing the first servicing tool to an outer surface of the sample head while the sample head is in the extended position;
removing the sample head using the first servicing tool, including by rotating the first servicing tool while clamped to the outer surface of the sample head and sliding the sample head out of the inner sleeve;
placing the second servicing tool within the inner sleeve and engaging the second servicing tool to the drive shaft;
securing the third servicing tool to an outer surface of the retaining sleeve while the second servicing tool remains connected to the drive shaft;
removing the retaining sleeve using the third servicing tool while the second servicing tool remains connected to the drive shaft, including by rotating the third servicing tool while clamped to the outer surface of the retaining sleeve and sliding the retaining sleeve off of the inner sleeve;
securing the fourth servicing tool to an outer surface of the inner sleeve while the second servicing tool remains within the inner sleeve; and
removing the inner sleeve using the fourth servicing tool, including by sliding the inner sleeve off of the second servicing tool, while the second servicing tool remains connected to the drive shaft.

19. The method of claim 18 further comprising:
removing the inner sleeve from the fourth servicing tool;
securing a replacement inner sleeve within the fourth servicing tool;
securing the replacement inner sleeve over the second servicing tool using the fourth servicing tool while the second servicing tool remains connected to the drive shaft;
removing the fourth servicing tool from the inner sleeve while the second servicing tool remains connected to the drive shaft;
reconnecting the retaining sleeve to the reactor sampling apparatus using the third servicing tool, including by sliding the retaining sleeve over the replacement inner sleeve and rotating the retaining sleeve while the third servicing tool remains secured to the retaining sleeve, and while the second servicing tool remains connected to the drive shaft;
disengaging the second servicing tool from the drive shaft; and
reconnecting the sample head to the reactor sampling apparatus using the first servicing tool, including by placing the sample head within the inner sleeve and rotating the first servicing tool while connected to the sample head.

\* \* \* \* \*

UNITED STATES PATENT AND TRADEMARK OFFICE
CERTIFICATE OF CORRECTION

| | | |
|---|---|---|
| PATENT NO. | : 12,480,085 B1 | Page 1 of 1 |
| APPLICATION NO. | : 19/039932 | |
| DATED | : November 25, 2025 | |
| INVENTOR(S) | : Peter Alfred Blacklin | |

It is certified that error appears in the above-identified patent and that said Letters Patent is hereby corrected as shown below:

In the Specification

In Column 5, Line 54, please delete "FIG. 30" and insert -- FIG. 3C --.

In the Claims

In Column 12, Line 66, Claim 1, please delete "A retaining" and insert -- a retaining --.

In Column 13, Line 58, Claim 9, please delete "through".

In Column 14, Line 37, Claim 13, please delete "and".

Signed and Sealed this
Tenth Day of February, 2026

John A. Squires
*Director of the United States Patent and Trademark Office*